United States Patent
Jayant et al.

(10) Patent No.: US 9,774,848 B2
(45) Date of Patent: Sep. 26, 2017

(54) EFFICIENT COMPRESSION AND TRANSPORT OF VIDEO OVER A NETWORK

(75) Inventors: Nikil Jayant, Alpharetta, GA (US); Joe Monaco, Atlanta, GA (US); Yucel Altunbasak, Norcross, GA (US); John Hartung, Mableton, GA (US); Santhana Krishnamachari, Smyrna, GA (US); Sam John, Atlanta, GA (US); Cham Ith, Atlanta, GA (US); Martin Sauser, Atlanta, GA (US); Chris Elliott, Smyrna, GA (US); James Pawlyk, Maplewood, NJ (US)

(73) Assignee: ARRIS Enterprises LLC, Suwanee, GA (US)

( * ) Notice: Subject to any disclaimer, the term of this patent is extended or adjusted under 35 U.S.C. 154(b) by 1346 days.

(21) Appl. No.: 13/099,693

(22) Filed: May 3, 2011

(65) Prior Publication Data
US 2011/0292996 A1    Dec. 1, 2011

Related U.S. Application Data

(62) Division of application No. 10/609,539, filed on Jul. 1, 2003, now Pat. No. 7,936,818.
(Continued)

(51) Int. Cl.
*H04N 7/12*     (2006.01)
*H04N 19/00*    (2014.01)
(Continued)

(52) U.S. Cl.
CPC ........... *H04N 19/00* (2013.01); *H04N 19/103* (2014.11); *H04N 19/124* (2014.11);
(Continued)

(58) Field of Classification Search
CPC ...... H04N 19/61; H04N 19/14; H04N 19/137; H04N 19/172; H04N 19/124
(Continued)

(56) References Cited

U.S. PATENT DOCUMENTS 4,984,076 A * 1/1991 Watanabe et al. ......... 375/240.2
5,305,115 A * 4/1994 Takahashi et al. ........... 382/248
(Continued)

OTHER PUBLICATIONS

U.S. Appl. No. 60/392,605, filed Jul. 1, 2002, titled Enhancements for Transporting Video Over a Network.
(Continued)

*Primary Examiner* — Gims Philippe
(74) *Attorney, Agent, or Firm* — Stewart M. Wiener

(57) ABSTRACT

The disclosed invention is a enhancement to the Video Encoder component of the MPEG standard to improve both the efficiency and quality of the video presentation at the display device. The inventions described below pertain to the enhancement of video compression technology. In general, they are compatible with MPEG video standards (as in current art), but represent novel enhancements thereof. The above inventions apply to several transmission media and networks including cable, DSL, wireless, satellite and IP networks. Another category of invention in this disclosure enhances networking performance by recognizing that the transmitted information is video, rather than data. This invention can be scaled to other classes of multimedia data such as speech or audio or images.

14 Claims, 19 Drawing Sheets

Related U.S. Application Data

(60) Provisional application No. 60/392,605, filed on Jul. 1, 2002, provisional application No. 60/458,956, filed on Apr. 1, 2003, provisional application No. 60/458,958, filed on Apr. 1, 2003.

(51) Int. Cl.

| | | |
|---|---|---|
| *H04N 19/196* | (2014.01) | |
| *H04N 19/52* | (2014.01) | |
| *H04N 19/139* | (2014.01) | |
| *H04N 19/176* | (2014.01) | |
| *H04N 19/147* | (2014.01) | |
| *H04N 19/172* | (2014.01) | |
| *H04N 19/46* | (2014.01) | |
| *H04N 19/149* | (2014.01) | |
| *H04N 19/15* | (2014.01) | |
| *H04N 19/61* | (2014.01) | |
| *H04N 19/103* | (2014.01) | |
| *H04N 19/124* | (2014.01) | |
| *H04N 19/126* | (2014.01) | |
| *H04N 19/14* | (2014.01) | |
| *H04N 19/137* | (2014.01) | |
| *H04N 19/142* | (2014.01) | |
| *H04N 19/152* | (2014.01) | |
| *H04N 19/154* | (2014.01) | |
| *H04N 19/177* | (2014.01) | |
| *H04N 19/179* | (2014.01) | |
| *H04N 19/19* | (2014.01) | |
| *H04N 19/194* | (2014.01) | |
| *H04N 19/80* | (2014.01) | |
| *H04N 19/53* | (2014.01) | |
| *H04N 19/567* | (2014.01) | |
| *H04N 19/517* | (2014.01) | |
| *H04N 19/85* | (2014.01) | |
| *H04N 19/87* | (2014.01) | |

(52) U.S. Cl.
CPC ......... *H04N 19/126* (2014.11); *H04N 19/137* (2014.11); *H04N 19/139* (2014.11); *H04N 19/14* (2014.11); *H04N 19/142* (2014.11); *H04N 19/147* (2014.11); *H04N 19/149* (2014.11); *H04N 19/15* (2014.11); *H04N 19/152* (2014.11); *H04N 19/154* (2014.11); *H04N 19/172* (2014.11); *H04N 19/176* (2014.11); *H04N 19/177* (2014.11); *H04N 19/179* (2014.11); *H04N 19/19* (2014.11); *H04N 19/194* (2014.11); *H04N 19/196* (2014.11); *H04N 19/197* (2014.11); *H04N 19/46* (2014.11); *H04N 19/517* (2014.11); *H04N 19/52* (2014.11); *H04N 19/53* (2014.11); *H04N 19/567* (2014.11); *H04N 19/61* (2014.11); *H04N 19/80* (2014.11); *H04N 19/85* (2014.11); *H04N 19/87* (2014.11)

(58) Field of Classification Search
USPC .............. 375/240.02–240.05, 240.2, 240.13; 382/251, 248, 267, 254
See application file for complete search history.

(56) References Cited

U.S. PATENT DOCUMENTS

| | | | |
|---|---|---|---|
| 5,526,054 A * | 6/1996 | Greenfield et al. ........... 348/467 | |
| 5,668,598 A | 9/1997 | Linzer et al. | |
| 5,699,457 A | 12/1997 | Adar et al. | |
| 5,990,957 A * | 11/1999 | Ryoo ................... H04N 19/176 375/240.03 | |
| 6,091,774 A | 7/2000 | Hyodo et al. | |
| 6,160,846 A | 12/2000 | Chiang et al. | |
| 6,167,162 A | 12/2000 | Jacquin et al. | |
| 6,192,081 B1 | 2/2001 | Chiang et al. | |
| 6,256,423 B1 | 7/2001 | Krishnamurthy et al. | |
| 6,275,614 B1 * | 8/2001 | Krishnamurthy ...... H04N 19/46 348/384.1 | |
| 6,463,100 B1 * | 10/2002 | Cho et al. ................. 375/240.03 | |
| 6,539,124 B2 * | 3/2003 | Sethuraman et al. ........ 382/251 | |
| 6,714,592 B1 * | 3/2004 | Liu et al. ................. 375/240.13 | |
| 6,937,770 B1 | 8/2005 | Oguz et al. | |
| 7,668,382 B2 * | 2/2010 | Wu .................... G06K 9/00456 382/162 | |
| 8,750,390 B2 * | 6/2014 | Sun .................... H04N 7/26058 375/240.29 | |
| 9,197,912 B2 * | 11/2015 | Raveendran ....... H04N 21/2365 | |
| 2002/0021756 A1 | 2/2002 | Jayant et al. | |
| 2003/0123747 A1 * | 7/2003 | Yang et al. ................... 382/254 | |
| 2003/0215011 A1 | 11/2003 | Wang et al. | |
| 2006/0256856 A1 * | 11/2006 | Koul ................... H04N 19/149 375/240.03 | |

OTHER PUBLICATIONS

U.S. Appl. No. 60/458,958, filed Apr. 1, 2003, titled Transport Packet Generation Using a Hardware/Software Architecture.

U.S. Appl. No. 60/458,956, filed Apr. 1, 2003, titled Multi-Scale Adaptive Coding System for Video Compression.

U.S. Appl. No. 09/902,976, filed Jul. 11, 2000, titled Video Compression Using Adaptive Selection of Groups of Frames, Adaptive Bit Allocation, and Adaptive Replenishment.

U.S. Appl. No. 60/426,163, filed Nov. 14, 2002, entitled Very Low Complexity Rate-Distortion Optimal Macroblock Mode Selection and Motion Estimation for MPEG-Like Encoders.

Conference Paper "Low Complexity Rate-Distortion Optimal Macroblock Mode Selection for Mpeg-Like Video Coders", by H. Kim and Y. Altunbasak and in Proc. of IEEE Int. Conf. Multimedia and Expo, Baltimore, Md., Jul. 2003.

Conference Paper "Low Complexity Rate-Distortion Optimal Macroblock Mode Selection and Motion Estimation for Mpeg-Like Encoders", by H. Kim, N. Kamaci, and Y. Altunbasak, submitted to IEEE Transactions on Circuits and Systems for Video Technology, Dec. 2, 2002.

* cited by examiner

FIG. 7

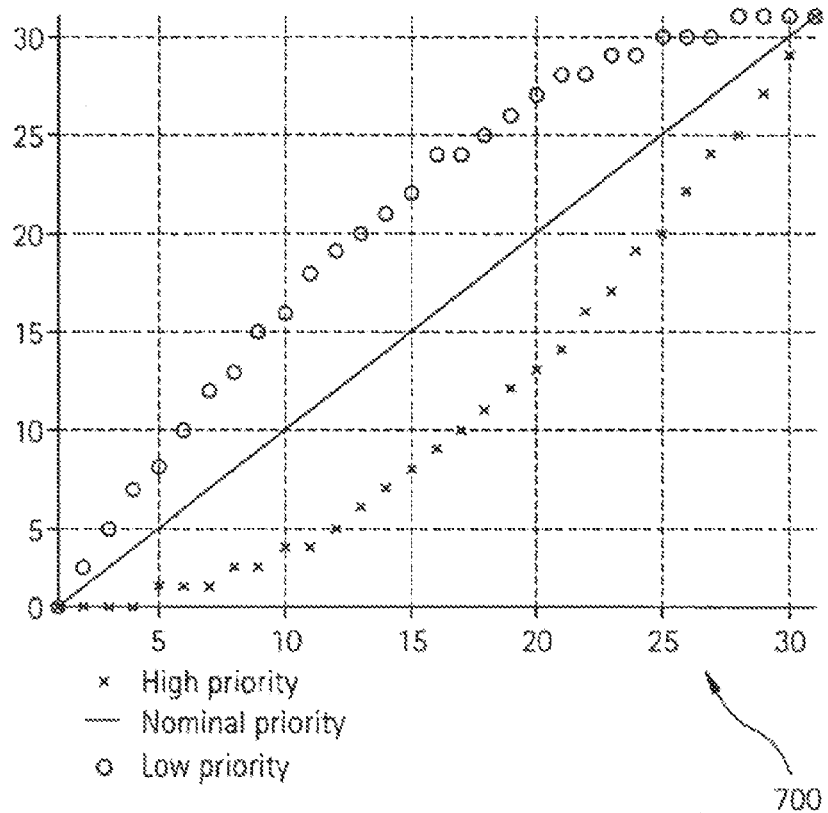

× High priority
— Nominal priority
○ Low priority

700

```
% Power factor used in curve
p = 2.0;

% Maximum quantizer output
qmax = 31;

% Quantizer input
q = 1:31;

%Calculate Q
nq = (qmax-1)*(q-1).^p/(max(q)-1)^p + 1;
niq = qmax - ( (qmax-1)*(max(q)-q).^(p)/(max(q)-1)^(p) );
nq = round(nq);
niq = round(niq);

% Generate plot
plot (q, nq, 'x' , q, q, q, niq, 'o');
legend ('High priority' , 'Nominal priority' , 'Low priority');
grid on
axis ( [1 31 1 31] );
```

Code used to generate example mapping tables.

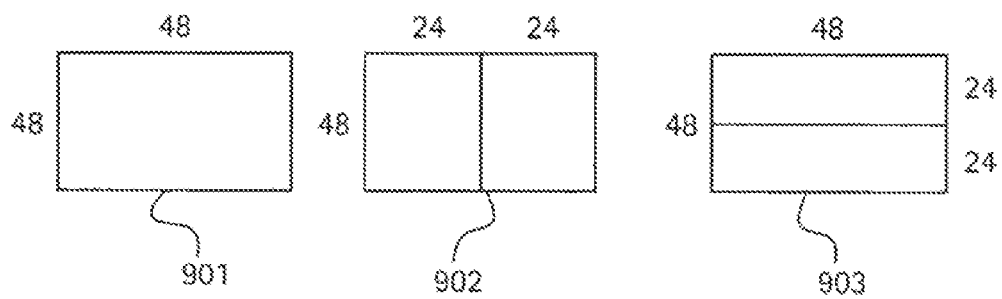

EFFICIENT COMPRESSION AND TRANSPORT OF VIDEO OVER A NETWORK

CROSS REFERENCE TO RELATED APPLICATIONS

This application claims priority as a Divisional Application of U.S. patent application Ser. No. 10/609,539 entitled "Efficient Compression and Transport of Video over a Network," filed on Jul. 1, 2003, which Application was a Non-Provisional of each of: U.S. Provisional Patent Application Ser. No. 60/392,605, entitled "Enhancements for Transporting Video over a Network," filed on Jul. 1, 2002; U.S. Provisional Patent Application Ser. No. 60/458,956, entitled ",", filed Apr. 1, 2003, and, U.S. Provisional Patent Application Ser. No. 60/458,958, entitled, ",", filed Apr. 1, 2003. Each of the disclosures referenced above are hereby incorporated by reference as if set forth herein in their entirety.

This application claims the benefit of U.S. Provisional Patent Application No. 60/392,605, filed on Jul. 1, 2002, titled ENHANCEMENTS FOR TRANSPORTING VIDEO OVER A NETWORK, which is hereby incorporated by reference for all purposes as if fully set forth herein.

This application claims the benefit of U.S. Provisional Patent Application No. 60/458,958, filed on Apr. 1, 2003, titled TRANSPORT PACKET GENERATION USING A HARDWARE/SOFTWARE ARCHITECTURE, which is hereby incorporated by reference for all purposes as if fully set forth herein.

This application claims the benefit of U.S. Provisional Patent Application No. 60/458,956, filed on Apr. 1, 2003, titled MULTI-SCALE ADAPTIVE CODING SYSTEM FOR VIDEO COMPRESSION, which is hereby incorporated by reference for all purposes as if fully set forth herein.

This disclosure incorporates by reference U.S. Nonprovisional patent application Ser. No. 09/902,976, filed on Jul. 11, 2000, titled VIDEO COMPRESSION USING ADAPTIVE SELECTION OF GROUPS OF FRAMES, ADAPTIVE BIT ALLOCATION, AND ADAPTIVE REPLENISHMENT, for all purposes as if fully set forth herein.

This disclosure incorporates by reference U.S. Provisional Patent Application No. 60/426,163, filed Nov. 14, 2002, entitled VERY LOW COMPLEXITY RATE-DISTORTION OPTIMAL MACROBLOCK MODE SELECTION AND MOTION ESTIMATION FOR MPEG-LIKE ENCODERS, filed in the names of Y. Altunbasak and H. Kim and based on Georgia Institute of Technology Invention Disclosure No. GTRC ID 2782, for all purposes as if fully set forth herein.

This disclosure incorporates by reference the conference paper LOW COMPLEXITY RATE-DISTORTION OPTIMAL MACROBLOCK MODE SELECTION FOR MPEG-LIKE VIDEO CODERS, by H. Kim and Y. Altunbasak and in Proc. Of IEEE Int. Conf. Multimedia and Expo, Baltimore, Md., July 2003.

This disclosure incorporates by reference the conference paper LOW COMPLEXITY RATE-DISTORTION OPTIMAL MACROBLOCK MODE SELECTION AND MOTION ESTIMATION FOR MPEG-LIKE ENCODERS, BY H. Kim, N. Kamaci, and Y. Altunbasak, submitted to IEEE Transactions on Circuits and Systems for Video Technology, Dec. 2, 2002.

BACKGROUND OF THE INVENTION

Field of the Invention

The present invention relates to the enhancement to the processes of compression and transport of multi-media data. Multi-media communications include the transmission, reception and presentation of multi-media data streams, including audio, audio and graphics, video, and synchronized audio and video data.

Multi-media data takes many forms known in the art. For example, audio data are stored as files of binary data using various formats. In some formats, the data are compressed so that the number of binary digits (bits) when stored in the file is less than the number of bits used during presentation to a human observer. Example image formats, often indicated by extensions on the names of the files used to store their data, include GIF, JPEG, TIFF, bit map (BMP), CGM, DXF, EPS, PCX, PDF, PIC, among others. Example audio formats, often indicated by extensions on the names of the files used to store their data, include waveform audio (WAV), MP3, audio interchange file format (AIFF), unix audio (AU), musical instrument digital interface (MIDI), and sound files (SND) among others. Example video formats, often indicated by extensions on the names of the files used to store their data, include QuickTime, AVI and the Motion Picture Experts Group format (MPEG), among others. Further treatment of the subject is provided in the book *Video Communication*. (1) *Image and Video Compression Standards*, V. Bhaskaran and K. Konstantinides, Kluwer Academic, 1995, the contents of which are hereby incorporated in their entirety.

Discussion of the Related Art

FIG. 1 is a block diagram that illustrates a system for delivering multi-media data using computer hardware over a network. An overview of computer hardware is described in more detail in a later section. On a network, a process called a client process (hereinafter, simply "client") operating on one computer, called a client device, makes a request of another process called a server process (hereinafter "server") executing on a computer, called a server device, connected to the network. The server performs the service, often sending information back to the client.

A server device 140 contains multi-media data in a file and a media transmission process 142 that transmits the file over wide area network 155 to the media server device 130. The media server device 130 includes a media server process 132 that conditions the data for transmission over local network 150 to a media presentation process 112 on media client device 110. The media presentation process 112 presents the multi-media data to a human user.

The media server device 130, the local network 150 and the media client device 110 constitute an access link that is sometimes called the "last mile," and sometimes called the "first mile," of the multi-media communications.

In some embodiments network 150 or network 155 or both are networks that use the Internet Protocol (IP) described below. In other embodiments, network 150 or network 155 or both are non-IP networks, such as a network of cable television links. On a cable television link, the media server device 130 is at the cable headend and the media client device 110 is a television set-top box.

The local network 150 may comprise a direct connection between media server device 130 and media client device 110. In other embodiments, the local network 150 includes one or more transcoders that convert from one type of signal to another, or multiplexers that overlay several data streams on the same line during the same time interval, or both. In some embodiments, the local network 150 includes one or more wireless links.

MPEG is a video compression standard that specifics the operation of the video decoder and the syntax of the compressed bitstream. The video information within the MPEG file represents a sequence of video frames. The amount of information used in MPEG to represent a frame of video varies greatly from frame to frame, based both on the visual content and the technique used to digitally represent ("encode") that content.

The visual content depends on the intensity (luminance) of each pixel, color space, the spatial variability of each frame, the temporal variability between successive frames, and the ability of the human visual system to perceive the intensity, color and variability.

An MPEG encoder employs three general techniques for encoding frames of video. The three techniques produce three types of frame data: Intra-frame ("I-frame") data, forward Predicted frame ("P-frame") data, and Bi-directional predicted frame ("B-frame") data. I-frame data includes all of the information required to completely recreate a frame. P-frame data contains information that represents the difference between a frame and the frame that corresponds to the previous I-frame or P-frame data. B-frame data contains information that represents relative movement between preceding I-frame data or P-frame data and succeeding I-frame data or P-frame data. These digital frame formats are described for MPEG 2 in detail in the international standard: ISO/IEC138181, 2, 3. Other standards exist for MPEG 1 as well as later MPEG versions. Documents that describe these standards (the "MPEG specifications") are available from ISSO/IEC copyright Office Case Postale 56, CH 1211, Geneve 20, Switzerland.

The basic idea behind MPEG is to reduce the number of bits required to represent video (video compression) by removing spatial redundancy within a video frame and removing temporal redundancy between video frames. Each frame is made up of two interlaced fields that are alternate groups of rows of pixels. Each field is made up of multiple macroblocks (MBs). Each MB is a two dimensional array of pixels, typically 16 rows of 16 pixels. Each macroblock consists of four luminance blocks, typically 8 rows of 8 pixels each, and two chrominance blocks, also 8 rows of 8 pixels each. Spatial redundancy is reduced using the Discrete Cosine Transform (DCT), typically on a block basis. Motion compensation is used to reduce temporal redundancy, typically on a macroblock basis. During motion compensation, a motion vector is computed that indicates pixel locations on a reference frame that are the basis for a particular macroblock on a different, current frame. Differences between the reference macroblock and the particular macroblock are then subjected to DCT processing.

Each video sequence is composed of a series of groups of pictures (GoPs). Each GoP is composed of a series of frames, beginning with an I-frame. A slice is a series of macroblocks and may make up a field or a portion of a field.

For playback, the data in the MPEG file is sent in a data stream (an "MPEG data stream" or "MPEG bitstream") to a client. For example, the MPEG bitstream is sent over network 150 from device 130 to device 110. The MPEG bitstream must conform to certain criteria set forth in the MPEG standards. For example, the MPEG bitstream should provide 30 frames per second but not provide so many bits per second that a client's buffers overflow. One bitstream criterion is that the bit rate be constant, e.g., a particular number of bits are sent each second to represent the 30 frames per second.

Another bitstream criterion is that the bit rate be variable, e.g., a different number of bits may be sent each second as long as a maximum bit rate is not exceeded.

During playback, an MPEG decoder at the client recovers video information from the MPEG bitstream. The video information for each frame is then sent to a display device.

The video information is sometimes converted to a form used by a particular display device. For example, for display on televisions employed in the United States, the video information is converted to the National Television System Committee (NTSC) format.

FIG. 2 is a block diagram that illustrates an enhanced MPEG encoder. The blocks represent operations performed on data. These operations may be implemented in hardware or software or some combination of both. Some blocks are conventional and others represent, or include, enhancements that are described in more detail in the following subsections. Each block is labeled for easy reference with a callout numeral either inside or adjacent to the block. Arrows that emerge or impinge on the blocks indicate data flow between operations. The thick arrows, such as the arrow labeled "Video In" that impinges on the preprocessing block 202, indicate the paths followed by the bulk of the video data. The data arriving on the "Video In" arrow is digital video data.

The preprocessor 202 performs any preprocessing known in the art. For example, the video data is filtered in space and time to remove noise. In another example, the data are converted from different formats, for example from bytes representing values of red, green, blue (RGB data) to values representing luminance and chrominance.

The Frame Delay 204 is used to allow different frames, such as a current frame and a reference frame, to be available simultaneously for comparison in other blocks, such as for motion compensation computations. At subtractor 206, the video data is differenced from a reference frame, if any.

Switch (SW) 208 passes blocks of video data. The Intra/Inter type of macroblocks is determined by the RD model selector 284 based on information received from other operations, as described in more detail in following subsections. The formatter 210 formats the blocks differently based on whether the block is an Intra block (I-block that stands alone like a block from an I-frame) or an Inter block (block that depends on another block and a motion vector, like at least some blocks from a B-frame or P-frame).

The DCT operation 220 transforms the data in a block from the spatial domain to a wavelength domain using the discrete cosine transform (DCT), providing amplitudes for 64 different two-dimensional wavelengths. The Forward Quantizer 222 reduces the accuracy of representation for the amplitudes, a simple example of this operation is to drop the least significant bits. This is a lossy step of the MPEG encoder; that is, this step discards some information. The information discarded is considered less relevant to a human observer than the information retained. According to some embodiments, the degree of quantization is variable and determined by the Quantization Adapter 224.

The video data output by the forward quantizer 222 is input to the variable length coder (VLC) encoder and multiplexer (MUX) 230. VLC is a lossless compression technique that represents the more frequently occurring bit sequences with short codes (using fewer bits) and less frequent bit sequences with longer codes (using more bits). The table associating frequently occurring bit sequences with codes are deduced in the VLC statistics processor 234.

The output from the VLC encoder and multiplexer 230 is accumulated as a bitstream in buffer 238. The bit stream is passed to a user, for example over a network, as the output bitstream, labeled "Bits Out" in FIG. 2.

According to some embodiments, special information is sent to a decoder about future GoPs. This special information is collected in Inter-GoP pre-send buffer 236 and passed to buffer 238 between GoPs.

Results of operations performed in blocks 270, 280, 282, 284 are passed as control signals that affect various operations on the video data flow from pre-processor 202 to buffer 238, as well as other portions of the MPEG encoder.

The human visual system (HVS) model 270 determines parameters that describe the human response to visual information in the frames output by the frame delay 204. The HVS parameters help determine the adaptive allocation of bits among different GoPs, different frames within a GoP and different macroblocks within a frame.

The selection of the encoding mode for a particular MB is based on balancing the achievable bit rate and size of the resulting difference (also called distortion) between the actual block and the prediction block, according to embodiments in the RD mode selection operation 284.

Motion compensated predicted frames and macroblocks are determined, described to a user, and made available for subtracting from reference frames and macroblocks in the motion compensation operations 260, including operations 262, 263, 265. These operations include the primarily conventional picture store 262, frame/field/dualprime motion estimator 263, and the frame/field/dualprime motion compensated predictor 265. Dualprime refers to a particular mode for motion compensation that is well known in the art but rarely used in current practice.

Input for the motion compensation operations 260 come from the previous MPEG compressed frame, based on the quantized DCT amplitudes. Wavelength domain video data are prepared for motion compensation operations 260 in operations 226, 228, 250, 252, 254, and 256.

In the inverse quantizer 226, the quantized amplitudes are expanded to their full number of bits, typically with trailing zeroes. In the inverse OCT (IDCT) operation 228, the wavelength domain amplitudes are converted to spatial information. The spatial information is formatted as blocks within macroblocks in the frame/field unformatter 250. In the adder 252, the reconstituted frame is treated as a difference and added to a motion compensated output.

Switch (SW) 254 passes blocks of video data from the motion compensated macroblocks to the adder. Switch (SW) 256 passes blocks of video data with the differences, if any, back in, from the adder 252 to the motion compensation operations 260.

FIG. 3 is a block diagram that illustrates a computer system 300 upon which an embodiment of the invention may be implemented. Computer system 300 includes a communication mechanism such as a bus 310 for passing information between other internal and external components of the computer system 300. Information is represented as physical signals of a measurable phenomenon, typically electric voltages, but including, in other embodiments, such phenomena as magnetic, electromagnetic, pressure, chemical, molecular and atomic interactions. For example, north and south magnetic fields, or a zero and non-zero electric voltage, represent two states (0, 1) of a binary digit (bit). A sequence of binary digits constitute digital data that is used to represent a number or code for a character. A bus 310 includes many parallel conductors of information so that information is transferred quickly among devices coupled to the bus 310. One or more processors 302 for processing information are coupled with the bus 310. A processor 302 performs a set of operations on information. The set of operations include bringing information in from the bus 310 and placing information on the bus 310. The set of operations also typically include comparing two or more units of information, shifting positions of units of information, and combining two or more units of information, such as by addition or multiplication. A sequence of operations to be executed by the processor 302 constitute computer instructions.

Computer system 300 also includes a memory 304 coupled to bus 310. The memory 304, such as a random access memory (RAM) or other dynamic storage device, stores information including computer instructions. Dynamic memory allows information stored therein to be changed by the computer system 300. RAM allows a unit of information stored at a location called a memory address to be stored and retrieved independently of information at neighboring addresses. The memory 304 is also used by the processor 302 to store temporary values during execution of computer instructions. The computer system 300 also includes a read only memory (ROM) 306 or other static storage device coupled to the bus 310 for storing static information, including instructions, that is not changed by the computer system 300. Also coupled to bus 310 is a non-volatile (persistent) storage device 308, such as a magnetic disk or optical disk, for storing information, including instructions, that persists even when the computer system 300 is turned off or otherwise loses power.

Information, including instructions, is provided to the bus 310 for use by the processor from an external input device 312, such as a keyboard containing alphanumeric keys operated by a human user, or a sensor. A sensor detects conditions in its vicinity and transforms those detections into signals compatible with the signals used to represent information in computer system 300. Other external devices coupled to bus 310, used primarily for interacting with humans, include a display device 314, such as a cathode ray tube (CRT) or a liquid crystal display (LCD), for presenting images, and a pointing device 316, such as a mouse or a trackball or cursor direction keys, for controlling a position of a small cursor image presented on the display 314 and issuing commands associated with graphical elements presented on the display 314.

In the illustrated embodiment, special purpose hardware, such as an application specific integrated circuit (IC) 320, is coupled to bus 310. The special purpose hardware is configured to perform operations not performed by processor 302 quickly enough for special purposes. Examples of application specific ICs include graphics accelerator cards for generating images for display 314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 300 also includes one or more instances of a communications interface 370 coupled to bus 310. Communication interface 370 provides a two-way communication coupling to a variety of external devices that operate with their own processors, such as printers, scanners and external disks. In general the coupling is with a network link 378 that is connected to a local network 380 to which a variety of external devices with their own processors are connected. For example, communication interface 370 may be a parallel port or a serial port or a universal serial bus (USB) port on a personal computer. In some embodiments, communications interface 370 is an integrated services digital network (ISDN) card or a digital subscriber line (DSL) card or a telephone modem that provides an information communication connection to a corresponding type of telephone line. In some embodiments, a communication interface 370 is a cable modem that converts signals on bus 310 into signals for a communication connection over a coaxial cable or into optical signals for a communication connection over a fiber optic cable. As another example, communications interface 370 may be a local area network (LAN) card to provide a data communication connection to a compatible LAN, such as Ethernet. Wireless links may also be implemented. For wireless links, the communications interface 370 sends and receives electrical, acoustic or electromagnetic; signals, including infrared and optical signals, that carry information streams, such as digital data. Such signals are examples of carrier waves.

The term computer-readable medium is used herein to refer to any medium that participates in providing instructions to processor 302 for execution. Such a medium may take many forms, including, but not limited to, non-volatile media, volatile media and transmission media. Non-volatile media include, for example, optical or magnetic disks, such as storage device 308. Volatile media include, for example, dynamic memory 304. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 378 typically provides information communication through one or more networks to other devices that use or process the information. For example, network link 378 may provide a connection through local network 380 to a host computer 382 or to equipment 384 operated by an Internet Service Provider (ISP). ISP equipment 384 in turn provides data communication services through the public, world-wide packetswitching communication network of networks now commonly referred to as the Internet 390. A computer called a server 392 connected to the Internet provides a service in response to information received over the Internet. For example, server 392 provides information representing video data for presentation at display 314.

The invention is related to the use of computer system 300 for implementing the techniques described herein. According to one embodiment of the invention, those techniques are performed by computer system 300 in response to processor 302 executing one or more sequences of one or more instructions contained in memory 304. Such instructions, also called software and program code, may be read into memory 304 from another computer-readable medium such as storage device 308. Execution of the sequences of instructions contained in memory 304 causes processor 302 to perform the method steps described herein. In alternative embodiments, hardware, such as application specifics integrated circuit 320, may be used in place of or in combination with software to implement the invention. Thus, embodiments of the invention are not limited to any specific combination of hardware and software.

The signals transmitted over network link 378 and other networks through communications interface 370, which carry information to and from computer system 300, are exemplary forms of carrier waves. Computer system 300 can send and receive information, including program code, through the networks 380, 390 among others, through network link 378 and communications interface 370. In an example using the Internet 390, a server 392 transmits program code for a particular application, requested by a message sent from computer 300, through Internet 390, ISP equipment 384, local network 380 and communications interface 370. The received code may be executed by processor 302 as it is received, or may be stored in storage device 308 or other nonvolatile storage for later execution, or both. In this manner, computer system 300 may obtain application program code in the form of a carrier wave.

Various forms of computer readable media may be involved in carrying one or more sequence of instructions or data or both to processor 302 for execution. For example, instructions and data may initially be carried on a magnetic disk of a remote computer such as host 382. The remote computer loads the instructions and data into its dynamic memory and sends the instructions and data over a telephone line using a modem. A modem local to the computer system 300 receives the instructions and data on a telephone line and uses an infra-red transmitter to convert the instructions and data to an infra-red signal, a carrier wave serving as the network link 378. An infrared detector serving as communications interface 370 receives the instructions and data carried in the infrared signal and places information representing the instructions and data onto bus 310. Bus 310 carries the information to memory 304 from which processor 302 retrieves and executes the instructions using some of the data sent with the instructions. The instructions and data received in memory 304 may optionally be stored on storage device 308, either before or after execution by the processor 302.

The following acronyms and symbols are used in this disclosure:

A—represents a first mode for predicting a macroblock, or a macroblock associated with a motion vector.

alpha ($\alpha$)—a coefficient relating distortion to variance and the fraction of zeroed DCT amplitudes, or a constant relating a number of bits to a complexity measure ASIC—application specific integrated circuit; a fast, special purpose processor B—Bi-directional type, represents a second mode for predicting a macroblock B-block—Bi-directional predicted block, based on a reference block in a preceding or subsequent frame and a motion vector B-frame—a frame with at least one B-block b/w—bandwidth CBR—constant bit rate Cideal—ideal congestion window, defined as the product of the data rate for a flow and a delay time D—distortion, a measure of the difference in the visual content between a macroblock and a motion compensated reference macroblock DCT—Discrete Cosine Transform delta ($\Delta$)—a factor for increasing the difference in bits assigned to pixels with more visually sensitive content Dt—threshold of DCT amplitude below which DCT wavelength is zeroed FD—frame difference between pixels in one frame and pixels from a reference frame GoP—group of pictures H—number of header bits H.26x—a family of video compression techniques including H.263 and H.264

HVS—Human visual system

I-block—intra-block, a block coded without reference to another block

IDCT—inverse DCT

I-frame—a frame made entirely of I-blocks

IP—Internet protocol for sending data packets over heterogeneous computer networks JND—just noticeable distortion K—coefficient of inverse proportionality between a number of bits to represent DCT amplitudes and the distortion remaining after applying the DCT, or the constant as defined above divided by the variance of the piece of video data represented by the DCT amplitudes.

k—an index representing one macroblock of a set of macroblocks in a frame, or a wait time associated with a particular packet priority lambda ($\lambda$)—a parameter indicating the relative importance of minimizing a motion vector to minimizing a difference between a current macroblock and a reference macroblock, or a factor used to give more bits to more visually sensitive groups of pixels MB—macroblock, a set of blocks processed together for motion compensation Mbps—Megabits per second MCFD—motion compensated frame difference MCframes—motion compensated frames ME—Motion Estimation MPEG—Motion Picture Experts Group, a family of video compression techniques including MPEG-1, MPEG-2, MPEG-4.

MSE—the measure of complexity (e.g., the distortion or the variance) of a GoP

Mt—threshold of motion tracked by human observer in HVS model mu ($\mu$)—a factor used to give more bits to more visually sensitive groups of pixels MV—motion vector, used to relate a macroblock in one frame to a pixels in a reference frame Mx—x component of motion vector of a macroblock My—y component of motion vector of a macroblock N—a number of frames of a type indicated by a subscript, or refers to a number of groups of pictures NTSC—National Television System Committee omega ($\omega$)—the ratio of alpha to theta ($\alpha/\theta$), a coefficient relating distortion to variance and number of bits O.5—sub-band coding compression $p_i$—a probability of occurrence for a group of pixels of a certain class, indicated by subscript i, of multiple classes of visual sensitivity, or a priority for the ith packet in a packet stream PP—priority profile, indicates a list of priorities for packets in a packet stream P-block—Predicted block, based on a reference block in a preceding frame and a motion vector P-frame—a frame with at least one P-block and no B-blocks pixel—picture element, the smallest positional unit for video information Q—degree of quantization, the number of bits for DCT amplitudes, or the number of patterns of sub-macroblocks in a macroblock R—number of bits to represent a piece of video information at a particular stage of processing, also called a rate, or the bit rate for a data flow carrying multimedia data over a network RGB—red, green, blue, a technique for representing video pixels rho ($\rho$)—the fraction of DCT amplitudes set to zero RISC—reduced instruction set circuit; a relative small, general purpose processor SAD—sum of absolute differences, a measure of the difference between two sets with the same number of pixels SNR—signal to noise ratio SW—block switch, an component of an MPEG encoder/decoder TCP—Transmission Control Protocol, a transport level protocol for IP that detects errors and missing packets theta ($\theta$)—a coefficient relating number of bits to the fraction of zeroed DCT amplitudes T—the number of bits to represent a header and DCT amplitudes associated with a given distortion level according to a bit production model TMN—Test model near-term; a document that specifies a prototype encoder; includes TMN5 used for MPEG2 and TMN10 used for H.263

TV—television

VLC—variable length coder, a lossless bit compression technique

SUMMARY OF THE INVENTION

Accordingly, the present invention is directed to the efficient compression and transport of video over a network that obviates one or more of the problems due to limitations and disadvantages of the related art. The efficiency in compression results in communication efficiencies in bandwidth-limited media and storage efficiencies in memory-limited media.

An advantage of the present invention is to provide a multi-scale adaptive video coding system, wherein the video data is analyzed at different scales (a multi-frame scale and a single-frame scale) for adaptive bit allocation. The quality of the coded data based on the adaptive bit allocation is evaluated by a Quality Monitor (VQM) block 290 that feeds back the evaluation back to the analysis modules enabling a content-adaptive operation of the encoder.

Another advantage of the present invention is to provide a method of look-ahead processing that determines the complexity of one or more of the GoPs and the frames contained in the GoPs. This is achieved by computing the mean removed sum of absolute (MRSA) values of all the pixels in the intra MB. For an non-intra block, this is computed by finding the minimum of the sum of absolute difference of the non-intra block and the best prediction block, and the MRSA of the non-intra block.

Another advantage of the present invention is to provide for the exploitation of human perception of spatio-temporal activity in a video, known as Human Visual System (HVS), for zero-sum bit allocation for video compression. According to this aspect of the invention, a method for allocating bits among portions of a frame to attain a target bit rate per frame includes performing the steps of: determining a particular class of visual sensitivity for a portion of the frame among a plurality of visual sensitivity classes; determining a number of bits associated with the particular class; and allocating a number of bits for the portion based on the number of bits associated with the particular class, wherein a sum over the plurality of classes of a product of the number of bits associated with each class and the probability that the portion belongs to the class is substantively equal to the target bit rate.

Another advantage of the present invention is to provide a Two-Pass Rate Control approach to adaptively allocate bits for video compression. According to this aspect, a method for allocating bits to a frame includes the steps of determining a first number of bits for a frame to achieve a target bit rate according to a first procedure that produces values for a number of header bits, a number of run-level pairs and a number of DCT bits; and, based on an actual number of run-level pairs for the frame to match the number of DCT bits, determining a second number of bits for the frame; and, allocating the second number of bits to the frame. The determination of the first number of bits is referred to as a first pass, and the determination of the second number of bits is referred to as a second pass.

Another advantage of the present invention is to provide a method for adaptive bit allocation for video compression that involves controlling the bit rate within a GoP. According to this approach, Intra-GoP Rate Control, a method for allocating a number of bits for a group of pictures to a plurality of frames for the group includes the steps of: determining a relationship between a variance in a frame to a number of bits for the frame for each type of frame among an I-frame type, P-frame-type and B-frame type in the group of pictures; determining a variance corresponding to each type of frame in the group of pictures; and determining a number of bits for each type of frame based at least in part on the relationship and the variance of each type of frame and the number of frames of each type of frame.

Another advantage of the present invention is to provide for the selection of quantizer values based on motion compensation. According to this aspect of the invention, a method for determining a degree of quantization for the DCT coefficients in a macroblock of pixels includes the steps of: determining a number of times the said macroblock is used as a reference for a macroblock in a subsequent frame; and determining a degree of quantization based on the number of times the said macroblock is used as a reference.

Another advantage of the present invention is to provide adaptive quantization selection for all the macroblocks in a frame based on the global statistics of the macroblocks in a frame for an optimal balance between bit rate and distortion.

Another advantage of the present invention is to provide for the exploitation of human perception of motion to enable adaptive quantization via a Temporal HVS Model. According to this aspect, a method for reducing the number of bits for certain macroblocks includes performing the steps of: determining whether a macroblock is associated with motion faster than a threshold speed for tracking by a human observer; and, if it is determined that the macroblock is associated motion faster than the threshold speed, using fewer bits to represent DCT amplitudes for blocks in the macroblock.

Another advantage of the present invention is to provide a technique for exploiting human perception involves accurate HVS biased bit rate control within a frame using a modulation function for the quantizer values.

Another advantage of the present invention is to provide enhanced efficiency of the compression and transport of video by improving the process of motion estimation. According a particular embodiment of the invention, a method for determining a macroblock used for motion compensation includes the steps of determining motion content of a frame; and defining at least one of a position of the macroblock and a size of the macroblock based on the motion content.

Another advantage of the present invention is to provide Adaptive Hierarchical Motion Estimation for Video Coding. According to this aspect of the invention, the motion estimation is adapted to the amount of motion present in a video sequence, the number of available compute cycles, source contents, source statistics, coding parameters, etc.

Another advantage of the present invention is to provide the use of ρ-Rate Optimization for Motion Vector selection. According to this aspect of the invention, selecting a motion vector for a particular macroblock relative to a reference frame includes the steps of: (1) determining a relationship for multiple blocks that relates a distortion between a motion-compensated reference macroblock and the particular macroblock to a number of bits for specifying DCT amplitudes for a difference between the motion compensated macroblock and the particular macroblock; (2) determining a plurality of rates corresponding to a plurality of candidate reference macroblocks in the reference frame based at least in part on the relationship and the variance of residuals between each candidate reference macroblock and the particular macroblock; (3) selecting a particular candidate reference macroblock associated with a minimum rate of the plurality of rates; and (4) determining the motion vector between the particular macroblock and the particular candidate reference macroblock.

Another advantage of the present invention is to provide enhanced efficiency of compression through improvements in mode selection for coding macroblocks. According to this aspect of the invention the coding mode of the macroblock is selected to optimize a rate-distortion criterion and also extended to optimal mode selection for a group of macroblocks.

Additional features and advantages of the invention will be set forth in the description which follows, and in part will be apparent from the description, or may be learned by practice on the invention. The objectives and other advantages, of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7 shows an example set of mapping functions for a 3 class MPEG2 system, used in Accurate HVS Biased Bit Rate Control;

FIG. 9 shows the N×N macroblock being partitioned into a predetermined number of patters, according to the Constrained Tiling implementation of Image Tiling for Motion Compensation;

FIG. 10 shows a frame divided into macroblocks before the merging of nearby blocks, as disclosed in the second approach to Image Tiling for Motion Compensation;

DETAILED DESCRIPTION OF THE ILLUSTRATED EMBODIMENTS

Reference will now be made in detail to embodiments of the present invention, examples of which are illustrated in the accompanying drawings.

The disclosed invention is an enhancement to the Video Encoder component of the MPEG standard to improve both the efficiency and quality of the video presentation at the display device. The inventions described below Pertain to the enhancement of video compression technology. In general, they are compatible with MPEG video standards (as in current art), but represent novel enhancements thereof. The inventive aspects apply to several transmission media and networks including cable, DSL, wireless, satellite and IP networks.

The present invention has the end effect of increasing the broadband margin or headroom in an application where there is a disparity between the data rate needed by the application and the data rate that the network can truly allocate to the application. In the specific application to cable television, impacts of the invention are to increase the number of television channels in a given frequency band as well as the functionality, such as interactivity and on-demand content provision.

Figure 2:
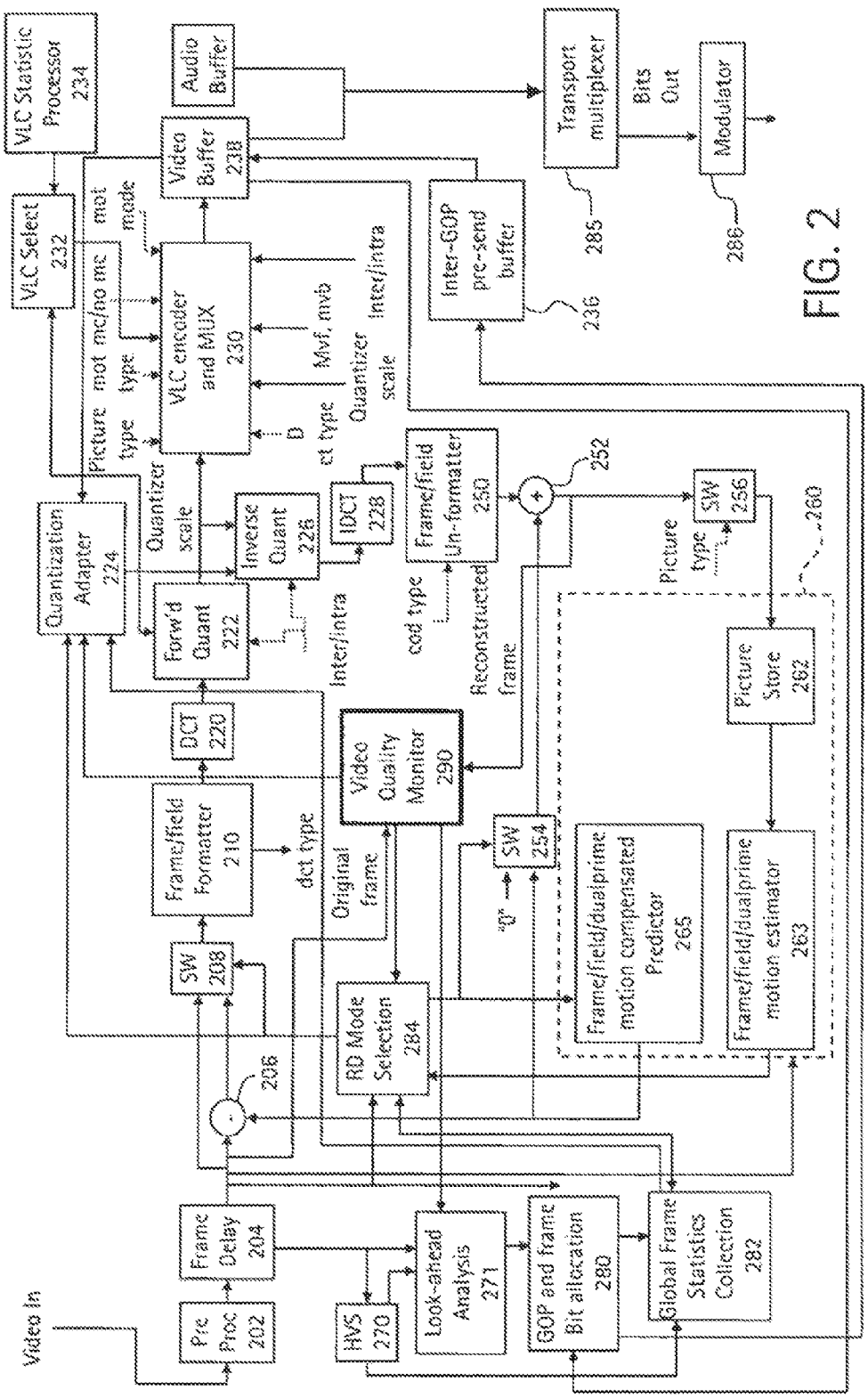
FIG. 2 is a block diagram that illustrates an enhanced MPEG encoder.
Figure 3:
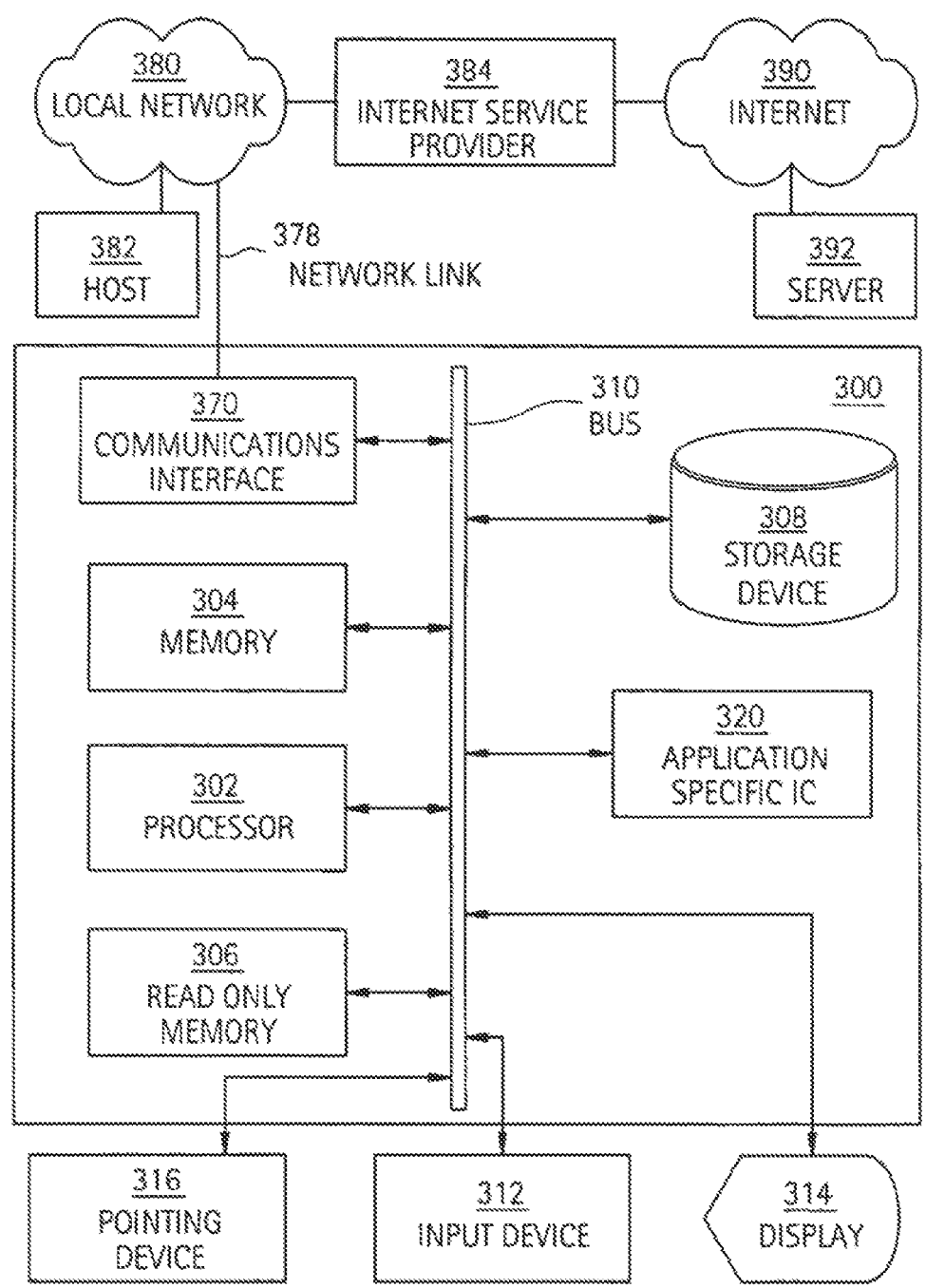
FIG. 3 is a block diagram that illustrates a computer system upon which an embodiment of the invention may be implemented.

FIG. 2 shows the various functional blocks of the enhanced MPEG-2 based video encoder that will be used in the description of the invention. The input to the video encoder is in the form of uncompressed digital video frames. The input video is passed through the pre-processor 202 for noise removal and other possible pre-processing operations such as resolution conversion, if required. Following the pre-processor, the look-ahead analyzer 271 operates on a group of video frames, say 15, 30 or 60 depending on the system latency restrictions. The look-ahead analyzer 271 performs various function such as detection of scene changes, 3:2 pull down detection for film inputs, estimation of individual frame entropies (measuring of coding difficulty), etc. Using the results of look-ahead analysis the aforementioned group of video frames is divided into a number of group-of-pictures (GoPs). Based on the total available bit-rate, the computed frame entropies, and the spatio-temporal Human Visual System (HVS) model 270, the GoP and frame bit allocation block 280 distributes the bits for individual GoPs and the frames within a GoP.

The individual frames are then coded as either I-frames (Intra), P-frames (Predictive) or B-frames (Bidirectional). An I-frame is coded independent of any of the previous coded frames. An I-frame is divided into macroblocks (MB) of 16×16 pixels. Each MB is further divided into blocks of 8×8 pixels. The individual blocks pass through the Discret Cosine Transform (DCT) and the resulting DCT coefficients are quantized. Based on the number of bits allocated to the current frame, the HVS classification of the current MB, and the result of the global frame statistic estimation 282, the quantization adapter 224 chooses a quantizer value for the current MB that optimizes video quality. Details of different methods of selecting the quantizer values based on rate-distortion criterion, motion information, HVS bias, spatio-temporal HVS models are presented later. The output of the quantizer is passed on to the VLC (Variable Length Coding) encoder for entropy coding. The entropy coding can be performed with the standard MPEG-2 specified VLC codes or based on the adaptive quantizer dependent VLC tables from the VLC select block 232. The quantized output is also sent through the Inverse quant and IDCT for frame reconstruction. The reconstructed frame is stored in either the Future picture store or the Previous picture store for future motion estimation.

Coding a P-frame or a B-frame is again achieved by dividing the frame into MBs. For each MB, using the adaptive hierarchical motion estimation or the rho-rate optimized motion estimation techniques the Frame/field/dual-prime motion estimator 263 finds the best reference MB in the reference frame from the Picture Store 262. The RD Mode Selection 284 chooses the best prediction mode for the current MB by trading-off the number of estimated bit used to code the motion vector and the resulting residual after motion compensation. Details of the rate-distortion optimal mode selection to choose the best coding mode for a single macroblock and the globally optimal mode selection to select the optimal mode for a group of macroblocks are presented later.

After coding each frame, the reconstructed frame and the original frame are sent to the Video Quality Monitor 290. Based on the HVS model, and by comparing the original and the reconstructed frame, the Video Quality Monitor estimates the quality of coding achieved with the current settings. The quality estimate by the Video Quality Monitor is fed-back to the Look-ahead analysis 271, Quantization adapter 224, RD Mode Selection 263 blocks to adapt the system parameters to the various characteristics of the input video.

The following is an embodiment of the invention that involves multi-scale adaptive coding for adaptive bit allocation. Video compression systems in general, operate on a series of bit allocation decisions. These decisions allow partitioning of the total available bits to different temporal sections of the video and to different spatial sections within a frame to maximize the video quality under a bit rate constraint. This is often accomplished by a combination of thresholds, parameters and models that guide in making various decisions. The main limitation of the pre-selected threshold, parameters or models is that they do not adequately capture the variability of the video data that is handled by a real encoder. Hence, there is a need for a system that adapts efficiently and effectively to the variation of the video content.

The video compression system that is proposed here operates at multiple scales and is iterative to correct for algorithm deficiencies and is adaptive to content characteristics. Specifically, the system operates at two scales, namely, the multi-frame scale (MFS) and the single-frame scale (SFS). Within an individual scale there are different modules associated with different tasks in the coding process. In the MFS long range processing and related bit allocation decisions are made, such as the look-ahead processing to detect scene changes, 3:2 pull down, and statistics collection for optimal bit budgeting over many groups of pictures (GoP). In the SFS decisions pertaining to coding a single frame such as the motion vector selection, coding type (mode) decisions for individual macroblocks and quantizer selection decisions are made.

In FIG. 2, the modules corresponding to the MFS are Look-ahead Analysis block 271 and the GoP and frame Bit allocation block 280. The modules corresponding to SFS include Global Frame Statistics Collection block 282, RD Mode Selection 284, Frame/Field/dual-prime motion estimator 263, Quantization adapter 224, etc.

Upon initialization, the modules in the MFS operate with default models and model parameters. Various operations, such as scene change detection and complexity estimation, are performed with these default models. The results of these operations are conveyed to the modules in the SFS and the models in the SFS are initialized based on these results. For example, based on the complexity estimation at the MFS, different rate-quality (rate-distortion) models (one for high complexity sequences and a different one for low complexity sequences) can be used at the SFS for quantizer selection. Another example is the detection of scene change guiding the motion estimation module to alter the type of motion estimation, i.e., to perform forward or backward motion vectors.

Upon completion of coding the current frame at the SFS, the coded frame and the original uncompressed frame are passed on to a Video Quality Monitor (VQM) block 290 in the encoder. This module compares the original and compressed frames to compute various subjective and objective video quality measures, e.g., step size, mean square error, as well as frame complexity or other parameters. Results of the VQM are fed back to the modules in the SFS and MFS to refine the model parameters. For example, the rate quality models used in the SFS are updated based on the number of bits used to code the current frame and the computed visual quality.

Similarly, the models used for the scene change detection or the complexity estimation at the MFS (blocks 271, 280) are updated based on the current frame coding results. For example, if the current coded frame used a majority of intra blocks, but the scene change detector had not detected a scene change, then this is an indicator to the scene change module that a valid scene change has not been detected. This results in refining the parameters of the module to correct for the undetected scene change.

The proposed system thus uses a feed forward control from the MFS to control and guide the modules in the SFS and a continuous feed back from the VQM module back to the SFS and MFS to adapt to the variation in the input video content.

The VQM comparisons described herein can be performed on a frame-by-frame, macroblock-by-macroblock, or sub-macroblock-by-sub-macroblock basis. E.g.: mean square error, average quantizer size, blocking artifact between adjacent macroblocks, relative bit distribution between macroblocks of different HVS clauses, etc. VQM may also keep track of the number of intra blocks within a given frame.

Within a single frame, coding can performed incrementally according to the statistics derived during coding of the same frame. In one embodiment, statistics are accumulated as a frame is encoded, and the resulting information is used after an entire frame is encoded and compared. Information within a macroblock can be used to adapt coding for later macroblocks in the same frame.

Given that future processing is going to be more capable, the VQM output can influence the (correction of the) coding of the current frame as well. For example:

1. Each MB in a picture can be coded in one of many different possible modes (forward, backward, bi-direction, INTRA, 0-motion etc). For each MB all possible prediction modes are used and the residual are computed. The resulting residual is quantized with a single fixed quantizer and the mode that results in the lowest value of a function f(Distortion, number_of_bits) is selected.
2. Once the mode decision is performed as above, each MB is quantized with all possible quantizer values allowed (MPEG2 allows 31 possible values). For each quantizer value, the resulting number of coded bits and the distortion are computed. The number of coded bits and distortion thus computed can be used in the "Rate-Distortion optimal Quantizer Selection" invention described later instead of the models that are described in that invention.

The following is an embodiment of the invention for performing video compression by performing adaptive bit allocation by means of look-ahead processing. In MPEG video compression, a given number of video frames (15, 30, 60 and so on) are grouped together to form a Group-of-Pictures (GoP). Pictures within a GoP are coded either as I, P or B pictures (frames). The number of bits allocated to each GoP is made proportional to the number of frames contained in it. Based on the number of bits allocated to a GoP, pictures within the GoP are allocated bit budgets. The bit budgeting is done in such a way that I-pictures are allocated the most bits per picture followed by P-pictures, and the B-pictures are allocated the least amount of bits. This is because B pictures are not used as a reference. Static allocation of frame bit budgets, like the one mentioned above, do not take into account the dynamic variability in video sequences. Hence there is a need for a system that looks ahead at the incoming data and adaptively allocates bits between different GoPs and also between pictures within a GoP. Two-pass encoding systems achieve this by looking at the whole video ahead of coding and sometimes even coding twice to decide on the dynamic bit allocation. But two-pass techniques have not been usable in real-time encoding because of the computational complexities and delay constraints. Therefore, there exists a need for a system that performs real-time look-ahead to collect statistics that enable adaptive bit allocation.

In the current invention, the real-time encoding system consists of a look-ahead processing unit (LAPU) and a coding unit (CU). The CU performs the actual video compression; the LAPU monitors the input video by looking ahead at a given number of video frames before they are sent to the CU. The delay tolerance of the system decides the maximum number of frames in the look-ahead. The LAPU collects simple, easy to compute, and re-usable statistics from the future frames and uses these statistics to estimate the complexity of the future frames and GoPs to be coded. The complexity of the frame is an indicator of the measure of difficulty in coding the frame; therefore frames and GoPs with larger complexity should be allocated more bits. One exemplary measure of complexity uses integer motion estimates to determine coding complexity.

The LAPU unit corresponds to the Look-ahead Analysis block 271 in FIG. 2. The CU consists of several other modules in FIG. 2 such as 282, 284, 263, 290, etc.

The LAPU collects the statistics for each frame as follows:

(1) for each frame or picture, the coding type (I, P or B) is decided and the frame is divided into many macroblocks (MB)

(2) If the current frame is an I-frame, for each MB, the mean removed sum of absolute (MRSA) values of all the pixels in the MB is computed; then, the sum of the MRSA values is computed over all MBs in the frame.

(3) If the current frame is a P-frame, for each MB, the best reference MB from the previous reference frame is found. The best reference MB is defined to be the one that results in the minimum sum of absolute (SAD) values of the difference between current MB and the reference frame.

(4) This SAD value is compared with the MRSA value of the current MB and the lesser of the two values is selected. The sums of the said value is computed over all MBs in the frame. If the said MRSA value is smaller than the SAD value, this is an indication that the CU may code this MB using the INTRA mode. The number of such blocks in the current frame that are estimated to be coded using INTRA mode is also computed.

(5) For B-frames, the processing is similar to the P-frames except that reference MBs are chosen from both the previous reference frame and the future reference frame.

The complexity of a frame is set proportional to the value and the number of estimated INTRA blocks computed for each frame in Steps (1) to (5) above. The larger the value and the number of estimated INTRA blocks, the more bits should be allocated to that frame. The complexity of a whole GoP is estimated by a weighted sum of the complexity values of the frames contained in the GoP.

When the CU begins to code a GoP, the LAPU passes the estimated complexity values for the frames in the current GoP and a number of future GoPs to the CU. Using the present and future GoP complexities, the CU intelligently allocates bits proportional to the complexity values, thereby maintaining uniform visual quality across GoPs.

After completing the bit allocation for the current GoP as described above, the CU allocates bits for the frames within the current GoP dynamically based on the estimated complexity values from the LAPU. Pictures with larger complexity values are allocated more bits and vice versa. After coding the current frame, the VQM block 290 of the CU computes the true complexity of the frame from the product of the number of coded bits and the average mean square errir if the reconstructed frame. This true complexity value is fed back to the LAPU. The LAPU compares the true complexity value and its own estimate of the complexity value that was already computed in Steps (1) to (5) to dynamically adjust the function relating the complexity estimate and computed statistics (SAD value and the number of intra macroblocks). This feed-back process allows the LAPU to correct for inconsistencies, if any, in the modeled relationship between the measured statistics and the complexity estimates.

It should be noted that other statistics that are similar but different from SAD can be used in the LAPU, such as the variance of the MBs. The motion estimation can be performed at various spatial resolution levels.

The following embodiment of the invention involves the exploitation of human perception of spatio-temporal activity in a video, known as Human Visual System (HVS), for zero-sum bit allocation for video compression. According to this aspect of the invention, a method for allocating bits among portions of a frame to attain a target bit rate per frame includes performing the steps of: determining a particular class of visual sensitivity for a portion of the frame among a plurality of visual sensitivity classes; determining a number of bits associated with the particular class; and allocating a number of bits for the portion based on the number of bits associated with the particular class, wherein a sum over the plurality of classes of a product of the number of bits associated with each class and the probability that the portion belongs to the class is substantively equal to the target bit rate.

In some embodiments, as shown below, steps of this method for bit allocation to fields, macroblocks or blocks are implemented in the HVS block 270, GoP and Frame Bit allocation block 280 and the Quantization Adapter block 224 of FIG. 2.

The theory behind the use of a Human Visual System (HVS), or spatio-temporal HVS Model is as follows. When a viewer watches a movie on television set, he sees a sequence of images in which objects appear to move. The perception of spatial-resolution varies with temporal frequency. At normal levels of brightness, a frequency of 50 fields/sec is the lower limit of the temporal rate required to perceive the motion as smooth. However, as the speed of the moving object increases, the perceptible spatial resolution decreases. The cause of this is that as the speed increases, the object cannot be tracked by the eyes. In taking advantage of this, we can use coarse quantization when there is high motion. The ability of the eye to track moving object is very important in determining what the eye can resolve. When an object starts moving suddenly, there is a critical duration before the eye in able to track the object. Once the eye is tracking the object, the ability to resolve spatial patterns improves.

In incorporating the HVS model into advanced algorithms for video compression, one needs to respond to subclasses of video input that have different levels of distortion-masking ability. The proposed method herein suggests the additional constraint of a zero-sum process in overall bit allocation across the input classes. Embodiments below are examples of such algorithms with alternate mathematical constructs for zero-sum bit allocation HVS coding. Common to some of these embodiments is a simple parameter that enables the tuning of the aggressiveness of the HVS model. For illustration, all examples below assume four classes (spatial, temporal or spatio-temporal, depending on the compression scenario).

In a first embodiment of this aspect of the invention, bit rate changes for the four classes are ($\lambda\Delta$, $\Delta$, $-\Delta$, and $-\lambda\Delta$), where Δ is the HVS intensity parameter. The bit rate changes are relative to a system with no HVS model. Given a zero sum:

$$p_1\lambda + p_2 - p_3 - p_4\lambda = 0$$

where $p_1$, $p_2$, $p_3$, and $p_4$ are the probabilities of the four classes. If the four probabilities are known, $$\lambda = \frac{(p_3 - p_2)}{(p_1 - p_4)}$$

whereby if λ is less that +1, the parameter Δ is forced to zero.

In the second embodiment of this aspect of the invention, the bit rate changes of the four classes are multiplicative, in which case, the four bit rates would be:

$$\left(\mu R, R, R, \frac{R}{\mu}\right)$$

Again, given a zero sum, $$p_1\mu + \frac{p_4}{\mu} + (p_2 + p_3 - 1) = 0$$

$$\mu = \left[\frac{(1 - p_2 - p_3) \pm \sqrt{((p_2 + p_3 - 1)^2 - 4p_1 p_4)}}{2p_1}\right]$$

in which μ is positive.

In the third embodiment of this aspect of the invention, the bit rates are:

$$\left(\mu_2, R, \mu_1 R, \frac{R}{\mu_1}, \frac{R}{\mu_2}\right)$$

and involve two degrees of freedom. Given this, the relation is asserted:

$$\mu_2 = \mu_1^\Delta$$

where Δ is a parameter controlling HVS intensity, and Δ>1. In which case:

$$p_1\mu_1^\Delta + p_2\mu_1 + \frac{p_3}{\mu_1} + \frac{p_4}{\mu_1^\Delta} = 1$$

Given this relation, the procedure for determining the parameters for zero sum bit allocation is as follows:
1) pick Δ>1;
2) determine $\mu_1$, based on $p_1$, $p_2$, $p_3$, and $p_4$; and
3) if $\mu_1$<1, force $\mu_1$=1.

While the invention has been shown and described with reference to certain preferred embodiments thereof, it will be understood by those skilled in the art that various changes in form and details may be made therein without departing from the spirit and scope of the invention as defined by the appended claims.

Another embodiment of the invention involves a Two-Pass Rate Control approach to adaptively allocating bits for video compression. According to this aspect, a method for allocating bits to a frame includes the steps of determining a first number of bits for a frame to achieve a target bit rate according to a first procedure that produces values for a number of header bits, a number of run-level pairs and a number of DCT bits; and, based on an actual number of run-level pairs for the frame to match the number of DCT bits, determining a second number of bits for the frame; and, allocating the second number of bits to the frame. The determination of the first number of bits is referred to as a first pass, and the determination of the second number of bits is referred to as a second pass.

In some embodiments as shown below, steps of this frame rate bit allocation are implemented in the GoP and frame Bit allocation block 280 of FIG. 2.

In this aspect of the invention, the bit rates consumed in the previous GoP are used to set a target bit rate in the bitstream for the frames in a current GoP. In the first pass, using the standard MPEG2 strategy, several parameters are defined to attempt to achieve the target rate. The parameters include, for each frame, the number of header bits, the number of motion vector bits, the number of run-level pairs, and the number of DCT bits. The number of run-level pairs is a function of the quantization factor, Q; the dependence on Q is determined empirically, either by fitting a non-linear curve through several observations, or by exhaustively determining the number of run-level pairs for each value of Q. The number of DCT bits means the number of bits in the bitstream used represent the DCT coefficients.

Rate control for CBR codecs can be divided into two tasks: allocating bits across the frames in a GoP; and, given the allocation of bits across frames, allocating bits within a particular frame in the GoP.

The first task is accomplished in the first encoding pass using the standard MPEG2 strategy implemented in the Berkley test code. The first pass attempts to hit a target rate that is set by looking at the rates required by past frames. In many cases the Beckley rate control does not achieve the target bit rate, but it does give a good indication of the number of bits that should be allocated to each frame. The inaccuracy of the result of the first pass, or the extent to which the first pass does not meet the target bit rate, is exploited in the second pass in that it may provide information on how difficult the frame will be to encode.

The second pass uses first pass data to allocate bits within each frame. In particular, the second pass uses the following info: the header bits required by first pass; the motion vector bits required by first pass; the number of run-level pairs in first pass; and the DCT bits required by first pass. The second pass rate control strategy matches the number of DCT bits required by the first pass.

Provided that the $1^{st}$ pass algorithm determines reasonable estimates of header bits, MV bits, number of run-level pairs, and DCT bits, this scheme can be used in a wide class of codecs. In particular, this class includes MPE4, H.263, H.264, and even less traditional approaches such as subband coding. The idea also extends to VBR coding, as long as the $1^{st}$ pass provides the required information.

Another method for adaptive bit allocation for video compression involves controlling the bit rate within a GoP. According to this approach, Intra-GoP Rate Control, a method for allocating a number of bits for a group of pictures to a plurality of frames for the group includes the steps of: determining a relationship between a variance in a frame to a number of bits for the frame for each type of frame among an I-frame type, P-frame-type and B-frame type in the group of pictures; determining a variance corresponding to each type of frame in the group of pictures; and determining a number of bits for each type of frame based at least in part on the relationship and the variance of each type of frame and the number of frames of each type of frame.

In some embodiments as described below, this aspect of the invention can be implemented in the GoP and frame Bit allocation block 280 of FIG. 2.

Figure 4:
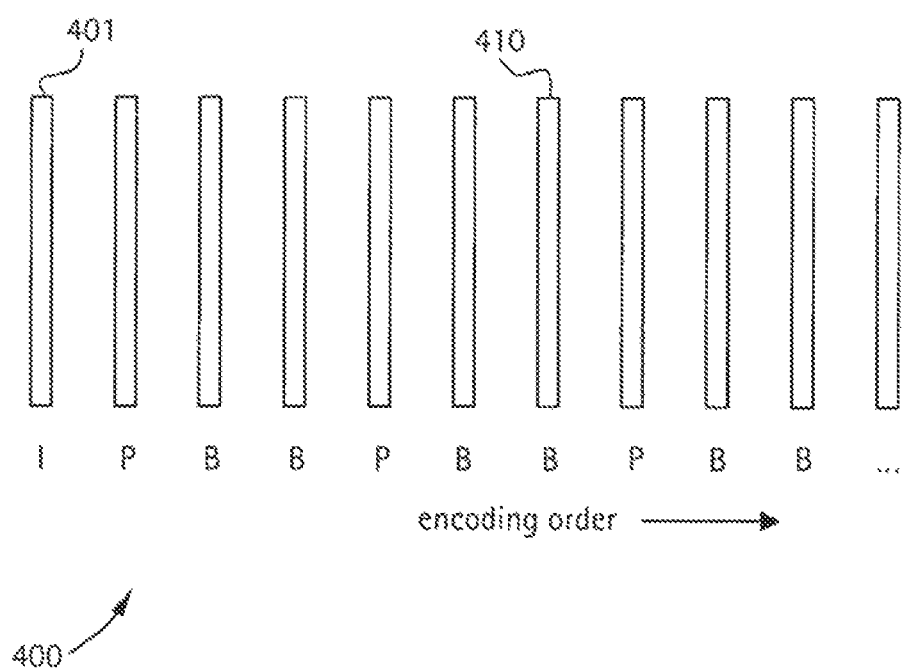
FIG. 4 shows a GoP, which is made up of frames.

FIG. 4 shows a GoP 400, which is made up of frames 410. In this aspect of the invention, R the total number of bits for the GoP, k stands for one of the types I (for I-frame), P (for P-frame) and B (for B-frame). The symbol R, when further subscripted always refers to a number of bits for the type of frame indicated by the subscript (I, P, or B). The subscripted symbol $N_F$ refers to the number of frames of the subscripted type in the GoP, and serves as a weighting factor. The coefficients $\alpha$, $\theta$, $\omega$ and variance $\sigma$ are similar to the definitions given above with respect to equation E3, but apply to a frame of a type indicated by the subscript rather than to a macroblock. The Intra-GoP steps are taken in operation 280.

FIG. 4 depicts a typical sequence of I, P, and B frames in an MPEG stream. Each frame is taken as a different source. The problem solved by this aspect of the invention is the distribution of bits constituting $N_B$ to the different frames within the GoP. The chosen solution is to extend $\rho$-rate control to the frame level, and take each frame as an individual source. The $\rho$-rate control model relates the number of bits used to code a frame R to the number of zero DCT coefficients $\rho$ and the distortion D to the variance of the coded frame as given below.

$$D = \sigma^2 e^{-\alpha(1-\rho)}$$

$$R = \theta(1-\rho)$$

The coefficients ($\alpha$, $\theta$) are thus associated to each frame type, resulting in the following representation:

$$(\alpha_I, \theta_I), (\alpha_P, \theta_P), (\alpha_B, \theta_B)$$

The method for performing intra-GoP rate control is as follows:
1) Initialize $\alpha_k$, $\theta_k$, where k=I, P, or B;
2) Setting the intraframe I 401 as frame 0, compute $$R_I = \omega_I N_I \ln\left(\frac{\sigma_I^2}{\omega_I}\right) + \frac{\omega_I N_I}{\sum_k \omega_k N_k}\left(N_{bit} - \sum_{k=I,P,B} \omega_k N_k \ln\left(\frac{\sigma_k^2}{\omega_k}\right)\right)$$

wherein $R_I$ is the optimal bit allocation for the first (frame 0) frame. But this requires knowing $\theta_k$, $\alpha_k$, for k=I, P, and B, and $\sigma_k$;

3. Code the first frame as an INTRA frame. Use $\theta_1$ and $\alpha_1$ as the starting $\theta$ and $\alpha$ in adaptation;
4. Update $\theta_1$ and $\alpha_1$ after the coding using the actual number of its and actual distortion, and update $\theta_1$ and $\alpha_1$;
5. Update R as $R_r = R_r - R_1(\text{actual}) = $ Remaining number of bits;
6. Re-calculate optimal bit allocations for the next frame using the same formula, $$R_P = \omega_P N_P \ln\left(\frac{\sigma_P^2}{\omega_P}\right) + \frac{\omega_I N_I}{\sum_k \omega_k N_k}\left(N_{bit} - \sum_{k=I,P,B} \omega_k N_k \ln\left(\frac{\sigma_k^2}{\omega_k}\right)\right)$$

wherein, R is changed and $\theta_1$, $\alpha_1$ is changed;
7. Go to step 5 and repeat the same steps for the rest of the P and B frames;
8. Note that $\alpha_k$, $\theta_k$ will be the same as prediction for the frames of the same type.

Now, the main problem is the initialization of $\alpha_k$, $\theta_k$s, and finding $\sigma_k^2$ for k=I, P, B.

The terms $\alpha_k$, $\theta_k$ may be taken from the previous GoP. The greater problem lies in finding $\sigma_k^2$. The are three approaches for this:

1) a two pass approach, run any MPEG encoder to find I, P, and B frames (MC Frames) and find $\sigma_k^2$ from these frames.
2) a one pass approach, using frame differences (rather than Motion Compensated frame differences) to find I, P, and B frames (approximately), and using these to estimate $\sigma_k^2$. Although $\sigma_k$ may not be accurate, that is not important; $\sigma_k/\sigma_j$ may be sufficiently good, which is more important;
3) making $\sigma_k$ a free parameter, whereby there will be a vector ($\alpha_k$, $\theta_k$, $\sigma_k$) for each frame type. The update and the framework is the same.

Another embodiment of the invention involves improving the efficient compression and transport of video by adaptive quantization of the signal. One method of implementing this is Quantizer Selection Based on Motion Compensation. According to this aspect of the invention, a method for determining a degree of quantization for amplitude associated with a wavelength of video information variations in a macroblock of pixels includes the steps of: determining a number of times the macroblock is used as a reference for a macroblock in a subsequent frame; and determining a degree of quantization based on the number of times the macroblock is used as a reference.

In this embodiment, the degree of quantization is given by the factor Q, expressing the number of most significant bits to retain for all retained amplitudes output by the DCT operation 220. The macroblock is used as a reference when it is chosen during motion compensation to serve as a prediction of the video content of a macroblock in another frame (either a B frame or a P frame) displaced by a motion vector determined during motion compensation.

This technique is useful not only in MPEG encoding but also in the video compression standards known as H.261, H.263, H.263+, H.263++, H.264 herein collectively referenced as "H.26x." H.263 is equivalent to MPEG4 simple profile. In the MPEG encoder of FIG. 2, the technique is implemented based on integer motion information obtained in the Look-ahead Analysis block 271 and this is used in the Quantization Adapter block 224 for adapting the quantizer values.

MPEG and H.26x video compression standards use motion compensation and discrete cosine transform (DCT) to remove the temporal and a partial redundancy for video frames. The motion vectors for the macroblocks (MB) in the P and B frames are obtained by searching for prediction MBs in the previously coded I or P frame. The initial integer-pel motion estimation can be performed with the original video frames. The residuals of the non-intra blocks after motion compensation or the intra blocks are DCT transformed and the resulting co-efficients are quantized. The quantizer value selected based on the number of bits allocated to the current frame and the complexity (activity) of the current MB. As such, the motion information is used in addition to the aforementioned entities for the selection of the quantizer for each macroblock.

Figure 5:
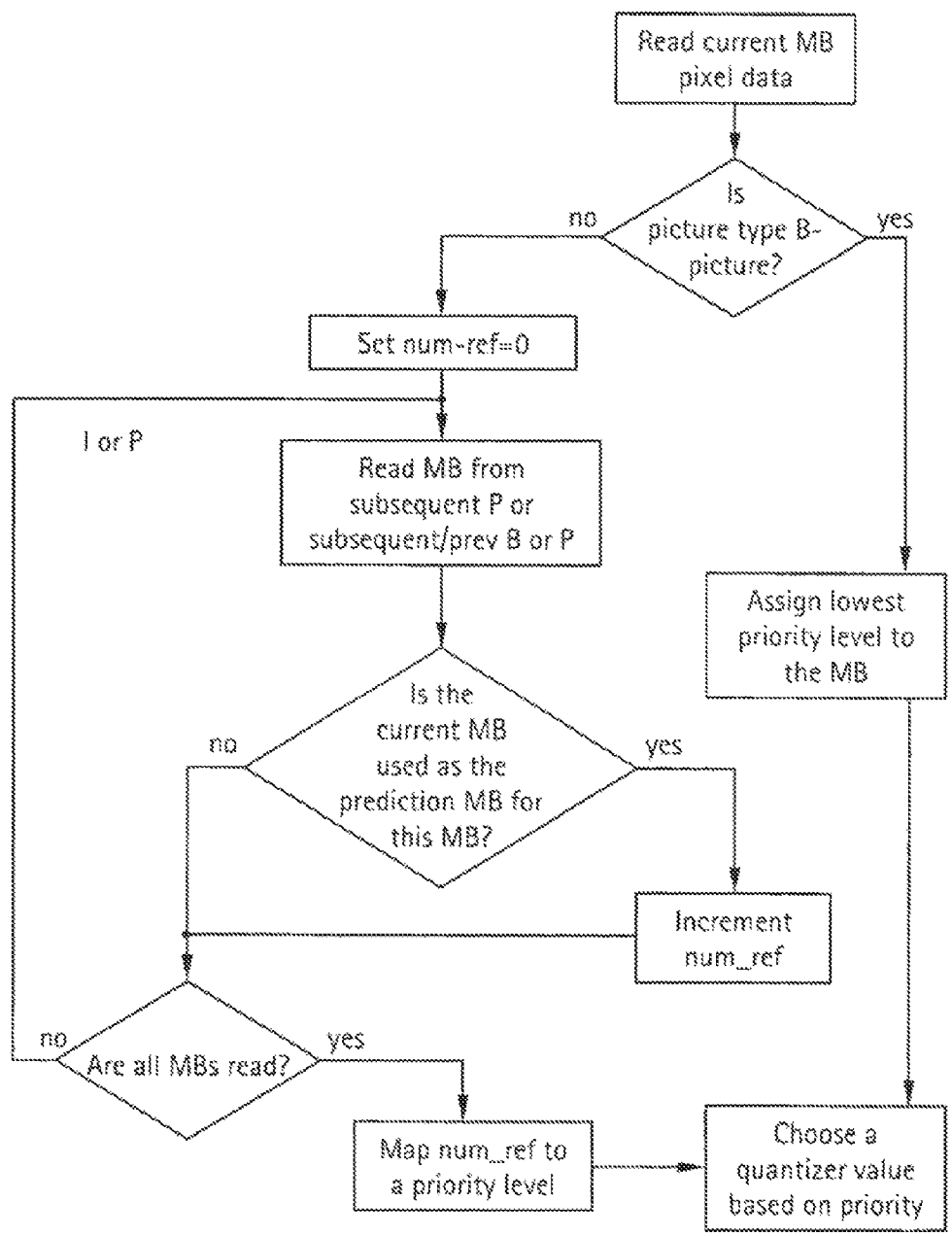
FIG. 5 shows a flowchart for the process of quantizer selection based on motion compensation.

The procedure for using the motion vector information in deciding the quantizer for a block is shown in FIG. 5, and is as follows.

(i) The given video response to be compressed is divided into a number of group of pictures (GoP), and a bit allocation is performed for the individual pictures within a GoP.

(ii) Using the original pictures, the integer-pel motion vectors for the P and B frames are computed in the Look-ahead Processor block 271 of FIG. 2.
(iii) While coding a MB in an I-frame, using the motion vector information, we compute the number of MBs on the subsequent P and B frames for which the current MB in the I-frame acted as the prediction block. The larger this number, the smaller the quantizer for the current MB and vice versa. It should be noted that the prediction MB need not exactly coincide with the 16×16 MB. So the partial overlap information should be used in the above calculation.
(iv) Coding of MBs in the P-frame is similar to the I-frame MBs in step (iii).
(v) Since B-frames are not used for predicting other frames, MBs in B-frames are never used as prediction blocks. Therefore, the MV information is not used for deciding the quantizer selection on MBs in B-frames.

Quantizer selection according to this invention also minimizes the error propagation in the case of packet loss when the video streamed over a lossy network.

Another embodiment of the invention involves adaptive quantization by selecting a quantizer value based on an optimal balance between bit rate and distortion in image and video, compression systems, the frame/image to the coded is divided into smaller units (such as blocks on macroblocks). Different quantizer values are used for the individual macroblocks to achieve a given target bit rate for the frame and to minimize the distortion D.

An embodiment of this invention as described below can be implemented in the Global Frame Statistics Collection block 282 and the Quantization Adapter block 224 of FIG. 2.

The different quantizer values that can be used are indexed by $q_j$ j=1, 2, Q, with $q_1 < q_2 < \ldots < q_Q$. The number Q and the values of $q_j$ are usually restricted by standards such as JPEG and MPEG.

The processing steps of the quantizer selection method according to the present invention are as follows:
1. A target number of bits $R_{tgt}$ is chosen for the current frame to be coded.
2. For each macroblock i (i=1, 2, ... N) in the picture, an estimate of the number of coded bits ($R_i q_j$) and the resulting distortion ($D_i q_j$) when the quantizer $q_j$ is used is obtained.

The estimate of $R_i q_j$ and $D_i q_j$ are obtained based on various macroblock features such as the variance, macroblock type—intra or non-intra, number of DCT coefficient runs, dead-zone in the quantizer, etc.

The distortion estimate $D_i q_j$ can be an estimate of the signal to noise ratio (psnr) or a measure of the perceptual quality.
3. For all macroblocks, choose the smallest quantizer $q_j$, j=1.
4. Compute the number of coded bits with the current quantizer selection=

$$R_{est} = \sum_{i=1}^{N} R_i q_j$$

5. If $R_{est} \leq R_{tgt}$, then exit.
6. Otherwise, for each macroblock i, increase the quantizer value by 1 and then compute the corresponding change in the rate and distortion, where, for example, $$\Delta D_i = D_i q_{j+1} - D_i q_j$$

$$\Delta R_i = R_i q_j - R_i q_{j+1}$$

7. For each macroblock i, compute a measure $$f_i = f(\Delta D_i, \Delta R_i)$$

The measure $f(\Delta D_i, \Delta R_i)$ can be of the form, for example:

$$\Delta D_i / \Delta R_i$$

or $$\Delta D_i \cdot \Delta R_i$$

and can vary according to the priority of the macroblock or according to Human Visual System principles.
8. Find the macroblock i* that has the most optimal value of $f_i$, for example if $f_i = \Delta D_i / \Delta R_i$, finding the macroblock with the smallest $f_i$ is equivalent to finding the smallest increase in distortion for a given reduction in the rate.
9. For the i* macroblock, increase the quantizer value from $q_j$ to $q_{j+1}$.
10. Update $Rest = R_{est} + \Delta R_i^*$
11. Repeat steps 5-10 until the condition in step 5 is satisfied or if the quantizer for all macroblocks have reached $q_Q$.

While, as described above, the present methodology is applied on a macroblock level, the methods can applied at other information levels. For example, the methodology may be applied on a per slice basis or a per frame basis, etc. Also, given adequate computational capacity, the optimal quantization methodology can be applied on a group of pictures level.

Another embodiment of the invention may exploit human perception of motion to enable adaptive quantization via a Temporal HVS Model. According to this aspect, a method for reducing the number of bits for certain macroblocks includes performing the steps of: determining whether a macroblock is associated with motion faster than a threshold speed for tracking by a human observer; and, if it is determined that the macroblock is associated motion faster than the threshold speed, using fewer bits to represent Discrete Cosine Transform amplitudes for blocks in the macroblock.

In some embodiments, fewer bits are used by decreasing the number of bits for each DCT amplitude. In some embodiments, fewer bits are used by forcing to zero amplitude those DCT amplitudes below a threshold amplitude.

Example embodiments are described below. A global motion vector refers to the local average motion vector of a group of macroblocks surrounding the current macroblock As mentioned earlier, the theory behind the Temporal HVS Model is as follows. When a viewer watches a movie on television set, he sees a sequence of images in which objects appear to move. The perception of spatial-resolution varies with temporal frequency. At normal levels of brightness, a frequency of 50 fields/sec is the lower limit of the temporal rate required to perceive the motion as smooth. However, as the speed of the moving object increases, the perceptible spatial resolution decreases. The cause of this is that as the speed increases, the object cannot be tracked by the eyes. In taking advantage of this, we can use coarse quantization when there is high motion. The ability of the eye to track moving object is very important in determining what the eye can resolve. When an object starts moving suddenly, there is a critical duration before the eye in able to track the object. Once the eye is tracking the object, the ability to resolve spatial patterns improves.

Another effect related to human perception of motion is Temporal Masking. Whenever there is a sudden spatio-temporal change, eyes take some time to adapt to the newer details. During this period eyes cannot resolve the fine details of the image. The periods of temporal masking can be exploited whereby quantization can be made coarse.

MPEG-2 encoders can be modified in such a way that it will exploit the temporal masking and motion tracking inabilities of our eyes, which can be used to get more bit rate reduction.

The steps of this method for coarse quantization are implemented in the HVS operation 270 and the Global Frame Statistics Collection block 282 in FIG. 2. The steps of thresholding coefficients to reduce the number of bits is performed in the Quantization adapter 224 of FIG. 2.

The algorithm works as follows. Let $M_t$ be the motion threshold, which is the maximum displacement (motion) our eyes can track without loosing any fine details. Let $M_x$ and $M_y$ represent the motion vectors of a macroblock. Thus we can use coarse quantization, provided the following relation.

$$\sqrt{(M_x^2 + M_y^2)} > M_t$$

Figure 6:
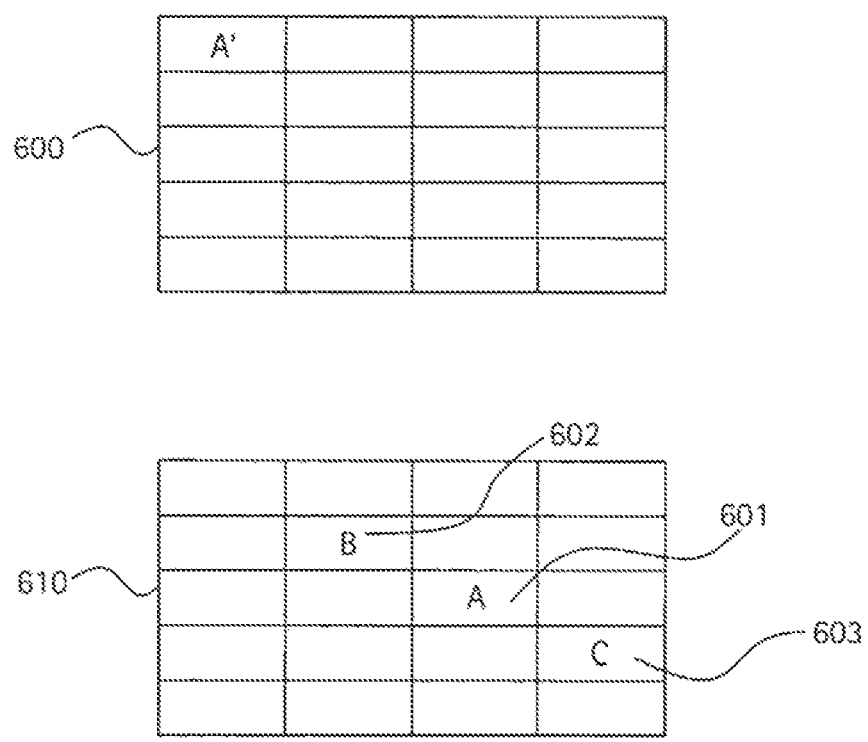
FIG. 6 depicts an example of the tracking of macroblocks, as implemented by the Temporal HVS Model aspect of the invention.

Referring to FIG. 6, the macroblock "A'" in the previous reference frame has moved to the position of macroblock "A" in the current frame. If the above relation holds for the macroblock "A" 601, then it can be coarsely quantized. In the present approach the 'global motion vectors' are used as a measure to check whether a block is moving or not. So to judge a block as a part of moving object, it must have a large global motion vector and a large individual motion vector.

In addition to the macroblocks that are a part of the fast moving object, other surrounding blocks can also be coarsely quantized. In FIG. 6, the macroblock "B" is covered by the motion of the object from "A'" to "A". In addition, the macroblock "C" will be covered in the future by the motion of the macroblock A. Therefore, it can be seen that the blocks marked as "B" 602 and "C" 603 can also be coarsely quantized, if "B" and "C" obey the following conditions: (1) it must be covered by the moving block in the past or in the future; and (2) it should not be a part of the moving object. In the present approach, the 'global motion vectors' may be used as a measure to check whether a block is moving or not. So to judge a block as a part of a moving object, it must have a higher global motion vector and individual motion vector.

There are different methods to reduce the number of bits for a given macroblock. For instance, a first approach is to use larger or coarser quantization; a second is to skip the high frequency DCT coefficients; and a third is to increase the dead zone of the quantizer by selecting a threshold $D_T$ such that all AC coefficients below $D_T$ are mapped to zero.

Another technique for exploiting human perception involves accurate HVS biased bit rate control. The topic for this disclosure is a method to combine HVS information with run-length based bit rate control to achieve an extremely accurate bit rate control algorithm that gives more bits to perceptually important image blocks. The standard run-length based rate control algorithm finds a relatively constant quantizer Q that will achieve a desired bit target by looking at the zero distribution (or equivalently run-lengths) of the residual, such as taught in "ρ-Domain Bit Allocation and Rate Control for Real Time Video Encoding" (Yong Kwan Kim, Zhihai He and Sanjit Mitra, "A Novel Linear Source Model and a Unified Rate Control Algorithm for H.263/MPEG-2/MPEG-4", *Proceedings of International Conference Acoustics, Speech and Signal Processing*, 2001), which is hereby incorporated by reference for all purposes as if fully set forth herein. The problem is that constant Q may not be subjectively (or even objectively) optimal. We want to incorporate human visual system (HVS) information to give more important blocks a lower Q relative to less important blocks.

To incorporate HVS information, we start with the assumption that each macroblock is assigned to one of N HVS classes. The algorithm for choosing the HVS classes does not matter and is beyond the scope of this disclosure. For each class there is an associated quantizer modulation function, F(Q). These modulation functions take a quantizer index as input and produce a new quantizer index as output. The modulation functions are used in the Global Frame Statistics Collection block 282 and the Quantization Adapter block 224 of FIG. 2.

In the standard Global Frame Statistics Collection block 282, each macroblock in the image is quantized with a small set of quantizer $Q_i$, and the number of zeros produced by each quantizer index is recorded in $Z_i$. The new HVS biased strategy changes this algorithm by quantizing with $F(Q_i)$ instead of $Q_i$. The number of zeros that result from quantizing with $F(Q_i)$ is stored at index i. The additional complexity required is quite small. The rest of the data collection process can be the same as previous or otherwise adapted.

In the standard Quantization Adapter block 224, the best quantizer index is computed based on the remaining number of bits and approximated zero distribution. The new HVS biased strategy computes the optimal index as before, but returns the new quantizer value after mapping it through the appropriate quantizer modulation function.

In an ideal situation, the new quantizer update routine would produce nearly constant Qs internally, as the standard zero based rate control algorithm does. This constant internal Q will be modulated by F(Q) to produce the final quantizer index used for coding. Therefore, if class A is more important than class B, then we expect $F_A(Qi) \leq F_B(Qi) \forall i$, and the values in F(Q) determine the relative perceptual importance of each class.

This approach allows us to incorporate HVS data while still providing very precise rate control. Target coefficient bit rates are usually hit with less then 1% error.

One example of HVS biasing applied in a rate control algorithm is determined by a set of Q mapping tables. Each HVS class uses a different Q mapping table to translate a standard Q value to an HVS weighted Q value. An exemplary mapping function derivation is described below.

The mapping function, f(Q), is constructed with the following constraints.
1. If class I has higher perceptual importance than class J, then $f_I(Q) \leq f_J(Q)$ for every value of Q.
2. $f_I(Q+1) \geq f_I(Q)$ (i.e. monotonically increasing)
3. $f_I(1) = 1$
4. $f_I(Qmax) = Qmax$ (Qmax=31 for MPEG2)

FIG. 7 shows an example set of mapping functions 700 for a 3 class MPEG2 system.

Besides the properties above that apply to the Q mapping for all classes, we also constrain the expected shape of low and high priority classes. Namely, high priority classes will have a smaller slope at low Qs than at high Qs, and low priority classes have a smaller slope at high Qs than at low Qs. To some extent conditions 1 and 2 above require this behavior, but we can write a more precise constraint as follows.

5. Define the class for which $f_N(Q) = Q$ as the nominal priority level. $f'(Q+1) \geq f'(Q)$ in classes below nominal priority level. $f'(Q+1) \leq f'(Q)$ in classes above nominal priority, where f' is the derivative operation: i.e.

$$\frac{2F(Q+1)}{2Q} \leq \frac{2F(Q)}{2Q}.$$

Another aspect of the invention is to enhance the efficiency of the compression and transport of video by improving the process of motion estimation. According a particular embodiment of the invention, referred to as Image Tiling for Motion Compensation, a method for determining a macroblock used for motion compensation includes the steps of: determining motion content of a frame; and defining at least one of a position of the macroblock and a size of the macroblock based on the motion content.

According to embodiments of this aspect, the method also includes encoding data with each macroblock, which data indicates a size of the macroblock and a pattern number indicating an arrangement of sub-macroblocks in the macroblock, wherein motion is described separately for each sub-macroblock. In the illustrated embodiment, Np represents the pattern number.

According to embodiments of this aspect, the method includes defining a plurality of sub-macroblocks; and merging adjacent sub-macroblocks into a particular macroblock if a first number of bits to encode motion and residuals for the particular macroblock is less than a second number of bits to encode two motion vectors and two residuals of the two adjacent sub-microblocks.

In this embodiment, MV 1 represents the motion vector for a current macroblock (either before or after merging, as is apparent from the context) and MV2 represents the motion vector of the next minimum-sized sub-macroblock in a pre-defined order for considering merges. Distortion (D) is a measure of the difference (e.g., the residual) in the visual content between a macroblock and a motion compensated reference macroblock. D1 represents the distortion of a current macroblock and D2 represents the distortion of the next minimum-sized sub-macroblock in a pre-defined order for considering merges. D also represents the distortion of a current macroblock after merging, as is apparent from the context. The entropy of a property indicates the number of bits used to represent that property. In the illustrated embodiment, a one-bit code indicates which minimum-sized sub-macroblocks are merged; a zero in a minimum sized-submacroblock indicates the sub-macroblock belongs to a new macroblock; and a one indicates the sub-macroblock belongs to the current macroblock.

According to embodiments of this aspect, the method also includes encoding with each macroblock data that indicates a length and a width of the rectangular macroblock, wherein each of the length and the width is an integer power of two. In FIG. 2, the technique is implemented in the motion compensation operations 260 and frame/field formatter 210. It should be noted that using block sizes other than 16×16 is not compliant with MPEG-2 specification.

MPEG 1 and 2 uses 16×16 blocks for motion compensation. Of course, this may not be the best size for a given sequence. In fact, optimal block size depends heavily on the motion content. Furthermore, it does not have to be constant over the whole image. Noting these, H.264 provided 7 different block sizes, but even this is not the optimal solution.

It is important to note that optimal block size is the result of a trade-off-equation. MPEG uses a single type (16×16) block so it does not have to send block type information. H.264 on the other hand needs to send 3 bits of information (in uncoded form).

Figure 8:
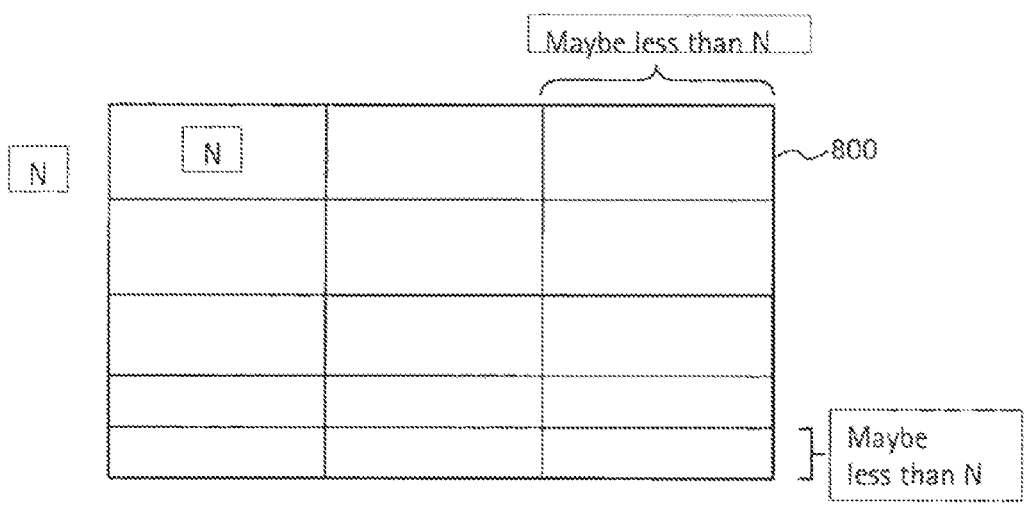
FIG. 8, shows a N×N macroblocks, as used in Image Tiling for Motion Compensation.

Here we will take 2 approaches. In the first approach, known as the Constrained Tiling approach, shown in FIG. 8, we define (N×N) Macro blocks 800. N maybe chosen to be a multiple of 8. Then each (N×N) MB is divided into Np predefined # of patterns. Therefore, we need to encode the following: the (N, Np) pair; one of the Np patterns; and one motion parameter set for all the block positions for this selected pattern. FIG. 9 shows an example in which N=48, and Np=3, the three resulting patterns 901, 902, and 903.

In this approach, the encoder chooses, and needs to choose, the following: N; Q; and motion information. Note that motion information does NOT have to be translational motion vectors. Other possible motion models include affine, bilinear, perspective, zoom, zoom+trans (3-por), rotation+translation. However, richer motion models require more parameters to encode. Furthermore, per MB Partition, we require the type of model to use.

Therefore, in the first approach, we assume that partitions are translational so that no motion type information need to be sent.

Figure 11:
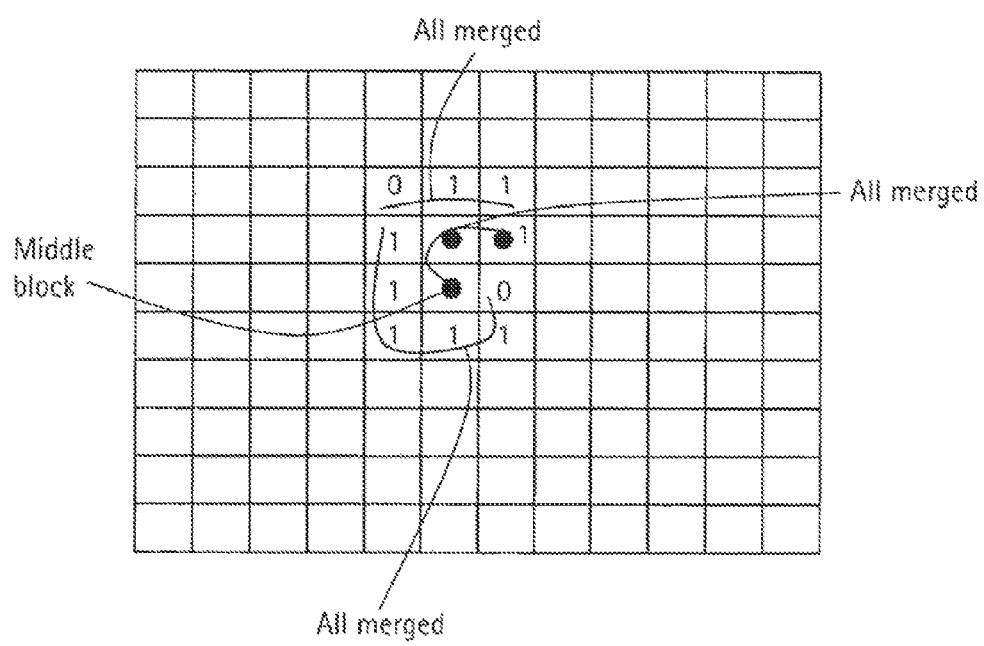
FIG. 11 shows the merging of nearby blocks according to the second approach to Image Tiling for Motion Compensation.

In the second approach, shown in FIG. 10 and FIG. 11, we divide the frames into 4×4 blocks 1001. The next step is to observe if the nearby blocks could be merged. The merging is done in a predefined order such as the one shown. First try to merge 0 with 1, then 2, then 3 and so on. Start the process in the middle of the image. Merging information can be coded 1 bit per block partition. Merging decision is made by looking at MV entropy vs. increase in distortion. For instance, before the merge, Cost=(Bits to encode MV1+MV2)+Entropy of $(D_1)$+ Entropy $(D_2)$, where $D_1$ and $D_2$ are motion compensated residual blocks. After the merge, Cost=Bits to encode MV1+Entropy of $D$, where D is the motion compensated merged block. Note that both encoder and decoder can keep track of block merges. The initial block size is chosen at the encoder side either at the GoP or frame level.

The third approach employs generic tiling. See FIG. 12 where the dimensions of the individual rectangular sections are not restricted as in the first two approaches except for the restrictions described below.

The restrictions to all three approaches are as follows: all blocks must be rectangular; and all blocks must be of a size that is an integer power of 2.

Another embodiment of the invention involves Adaptive Hierarchical Motion Estimation for Video Coding. According to this aspect of the invention, the amount of motion present in a video sequence changes spatio-temporally. In a video coding environment with constrained computational resources, this variation can be exploited. For example, suppose each frame receives a fixed number of cycles for motion estimates. When motion is small (or smooth), a small denser set of candidate motion vectors can be evaluated for this fixed cost, or cycles can be saved by simply reducing the search region. If motion is larger, then the search region should be larger. This larger region requires evaluation of motion vectors on a sparser grid to constrain computational complexity.

This aspect of the invention can be implemented in the Frame/field/dualprime motion estimator block 263 of FIG. 2.

A hierarchical motion estimation (ME) algorithm provides an efficient means to exploit this concept. The unique component of this strategy is the use of different resolution levels temporally and/or spatially. Increasing the number of resolution levels used increases complexity, but gives larger, more complex motion fields. Decreasing the number of resolution levels decreases complexity at the expense of smaller (fewer) motion vectors and smoother fields. Using adaptive hierarchical ME, we can easily adapt to scene contrast or computational constraints by modifying the number of resolution levels as described below:

First, decide upon a maximum number, N, of resolution levels. This value may change with time in general. Each anchor image (i.e., an I or P frame) is successively downsampled by 2 in each direction N−1 times. Each of these resolution levels must be saved. B frames are also downsampled at most N−1 times. This is an opportunity for saving cycles and memory. In B frames, unused resolution levels do not have to be computed or stored.

Second, ME always starts at the coarsest level and proceeds to the finest. Each motion vector at resolution M serves as a starting point for a 2×2 group of blocks at resolution M+1. This is standard for hierarchical ME algorithms. There are two coding consequences to using more resolution levels for a given block. First, the maximum displacement of the block increases. Second, the smoothness of the motion field in the region surrounding the block decreases. Both of these properties are generally more desirable for complex scenes.

Third, the strategy for adapting the ME algorithm requires the use of different levels of resolution spatially and/or temporally.

Examples of various adaptation to customize motion vector selection in real time are discussed below.

Adaptation driven by computational constraints—If the ME cycle budget cannot be met using the maximum number of resolution levels for all three types of images, then a simple strategy to reduce computation by approximately ⅓ is to use the maximum number of levels on P frames and one fewer level in B frames. We choose to use more levels on P frames for three reasons. First, P frames are farther apart temporally so they naturally require a more complex motion vector field. Second, P frames are only predicted in one direction so they are half as complex for B frames with the same number of resolution levels to start with. Finally, P frames are used for prediction in future frames, so it is very important to get the best quality possible in these frames. Since P frames are so much more important than B frames to achieve good coding quality, this strategy leads to very little loss in coding quality. In one exemplary implementation, the cycle counts are monitored once per second and this feedback mechanism can be used to determine when it is necessary to reduce resolution levels.

Adaptation driven by source content—when something about the source content is known from examining the incoming video or via user settings, the number of levels may be adapted. For example, if the user changes the resolution of the source content (i.e. D1 to halfD1, NTSC to PAL, SD to HD, etc.), then it is known whether the number of resolution levels can be increased for better performance or if the number levels should be decreased to meet real time constraints. Besides resolution, we can also use the internal film detection module to increase the number of resolution levels when film is detected. This is possible because film content is only at 24 fps, while normal NTSC video is 30 fps.

Simple adaptation driven by source statistics—statistics are collected in the color conversion module that can be used to guide which frames should use more resolution levels. In particular, the frame difference is known for each frame. This knowledge can be used to increase the number of resolution levels for a group of frames that have higher frame differences. Another statistic that could be calculated and used is a estimate of the camera motion. Existing frame difference information and some gradient calculations can be used to estimate global camera motion. When significant camera motion is present, more levels should be used because they provide a larger search range.

Adaptation driven by coding parameters—while the above examples are mainly aimed at how we would trade off computation and resolution levels, there are also cases where adaptation is made to improve coding performance regardless of computational concerns. A clear example of this is when the coding rate is very low. In this case, it is often better to favor a smoother more natural motion vector field over the one that produces the absolute lowest prediction error. The motion vector field is forced to be smoother simply by using fewer resolution levels. Another coding parameter that could have an impact is whether or not noise reduction is enabled. Without noise reduction, smoother motion vectors may be superior.

Complex adaptation driven by source statistic/coding parameters—certain examples above may consider changing resolution level at the frame level, but there is no reason why the same sort of statistics cannot be applied to adapt motion estimation at the macroblock level. Examples of relevant statistics that could be used at the macroblock level include frame difference, measures of texture, and measures of edge strength. Large frame differences and crisp edges suggest more levels to achieve better prediction, while high levels of texture suggest fewer levels to achieve smoother motion.

Another embodiment of the invention involves the use of ρ-Rate Optimization for Motion Vector selection. According to this aspect of the invention, selecting a motion vector for a particular macroblock relative to a reference frame includes the steps of: (1) determining a relationship for multiple blocks that relates a distortion between a motion-compensated reference macroblock and the particular macroblock to a number of bits for specifying DCT amplitudes for a difference between the motion compensated macroblock and the particular macroblock; (2) determining a plurality of rates corresponding to a plurality of candidate reference macroblocks in the reference frame based at least in part on the relationship and the variance of residuals between each candidate reference macroblock and the particular macroblock; (3) selecting a particular candidate reference macroblock associated with a minimum rate of the plurality of rates; and (4) determining the motion vector between the particular macroblock and the particular candidate reference macroblock.

This aspect of the invention can be implemented in the Frame/field/dualprime motion estimator block 263 of FIG. 2.

In this particular illustrated embodiment, the relationship is given by combining the following equations.

$$D = \sigma^2 e^{-\alpha(1-\rho)} \qquad (E1)$$

$$R = \theta(1-\rho) \qquad (E2)$$

$$D = \sigma^2 e^{-(\frac{\alpha}{\theta})R} = \sigma^2 e^{-(\omega)R} \qquad (E3)$$

In these equations, ρ is the fraction of DCT amplitudes that are set to zero due to quantization. For example, when there are 64 DCT amplitudes for 64 two dimensional wavelengths, and amplitudes for 48 wavelengths are set to zero, then ρ equals 0.75. D is distortion, as defined above, $\sigma^2$ is variance of the differences between the particular macroblock and a reference macroblock, R is the number of bits to specify the non-zero, quantized DCT amplitudes. The equation E2 gives the so-called ρ-rate control model in which the number of bits for a set of DCT amplitudes that describe multiple blocks is linearly related to the fraction of zero amplitudes for that set.

The parameters α and θ are coefficients determined empirically by fitting data; the parameter ω is the ratio of α to θ. The relationship of distortion to number of bits given by equation E3 is determined when α and θ are determined.

The objective is to try to find the Motion Vector that achieves a given Distortion D, and minimizes the rate R. The method is implemented as follows:

At the current MB
1) Evaluate the DFD for N candidate reference macroblocks;
2) Choose M motion vector candidates with the lowest DFD;
3) For each of the candidate MV's found in step 3, do the following:
   4-a) Find the $R_1$ (number of bits to encode this motion vector using a look-up table);
   4-b) Find the variance $\sigma^2$ corresponding to this MV;
   4-c) Using $D_{desired} = \sigma^2 e^{-(\omega)R_2}$, find $R_2$ (number of bits to encode the residual), wherein $D_{desired}$ is the desired distortion, and wherein D may be much larger than $D_{desired}$; and
   4-d) $R_t = R_1 + R_2$. Choose the MV that gives the minimum $R_t$.

It will be apparent to someone skilled in the art that variations of the algorithm are possible, for instance, by basing $D_{desired}$ on D instead of $\sigma^2$, or some similar substitute.

The following is done to compute the value of ω. For one of the MV candidates (and it does not matter which one) do the following:
i) motion compensate;
ii) find residual;
iii) take DCT, Quantize, and VLC encode;
iv) find θ and ρ, by curve fitting using this data; and
v) compute $$\omega = \frac{\alpha}{\theta}.$$

Note that α and θ will be the same for all other candidates, so there is not need to do it for more than one.

One can choose $D_{desired}$ (especially for constant quality CBR/VRS video coding), or $D_{desired}$ could be the weighted average of the past few frames. The advantages are as follows: it finds the best motion vector in the R-D sense, where R and D models used are in equations E1 and E2.

Efficiency of compression may be enhanced through improvements in mode selection for coding macroblocks. The macroblock mode selection deals with selection of the coding mode for a macroblock, e.g., a macroblock in a P-frame can be coded with frame forward, field forward, zero motion or intra coding modes. A method for selecting the coding mode uses a trade-off between the number of bits required to code the resulting residual after motion compensation and the number of bits required to code the motion vector. Techniques available in the existing literature use a "lagrangian" technique for mode selection. For each of the possible modes, the sum of the resulting SAD (or another similar function of the residuals) and the product of a lagrangian parameter times the motion vector bits is computed. The mode that results in the minimum value of the said computation is selected. In another related art technique, the following equations are used in mode decision.

$$D = \sigma^2 e^{-(\omega)R} \quad (1)$$

where, R is the number of bits used to code the residuals of a given macroblock, $\sigma^2$ is the variance of the residual of a given macroblock, and D is the resulting distortion. The total number of coded bits produced by the macroblock is given by the following relation:

$$R_{MB} = R + R_{mv} + R_{header}$$

where $R_{mv}$ is the number of bits used to code the motion vector and $R_{header}$ is the number of bits used by macroblock header. Rewriting the equation (1) results in the following $$D = \sigma^2 e^{-(\omega)(R_{MB} - R_{header} - R_{mv})}$$

Assuming that the target $R_{MB}$ given to a macroblock and the number of header bits used are independent of the mode, the above is simplified to be a function of the residual variance and the motion vector bits.

$$D = K\sigma^2 e^{(\omega)R_{mv}}$$

For mode selection, the value of $\sigma^2$ and $R_{mv}$ is computed for each candidate mode and the that results in the lowest D is selected. It is assumed that ω is the same for all macroblocks within a frame. At the end of coding a frame the value ω is updated using equation (1).

Another object of the invention is to enhance the efficiency of compression through improvements in mode selection for coding macroblocks. In this particular embodiment, this object may be achieved through Globally Optimum Macroblock Mode Selection. In the MPEG-2 video coding standard, a macroblock can be coded using different coding modes. The macroblocks in the P-frames are coded using (1) frame predicted mode (2) field predicted mode (3) zero motion vector mode or (4) intra mode. For B-frames, there are seven choices (1) frame forward mode (2) field forward mode (3) frame backward mode (4) field backward (5) frame bi-directional mode (6) field bi-directional mode and (7) intra mode. In the related art, the coding mode of each macroblock is selected by comparing the residual SAD (sum of Absolute differences) after motion compensation and the number of bits required to code the motion vectors. The intra/inter decision is made by comparing the variance of the predictive residuals and the variance of the macroblock pixels. The main disadvantage of the related art mode selection techniques is that they consider each macroblock independently and make the best decision pertaining to that macroblock. Since many parameters like the motion vector, DC coefficient values are coded differentially, better coding decision can be made by considering a group of macroblocks as a single unit and making a collective decision that is optimal for a group of macroblocks.

This aspect of the invention can be implemented in the Global Frame Statistic Collection block 282 and the RD Mode Selection block 284 of FIG. 2.

As mentioned earlier, the motion vectors (MVs) of a macroblock are coded differentially with respect to the MVs of the previous macroblock in the same slice. The MVs of the first macroblock in a slice are coded independently. Hence there is some dependency between the modes of the macroblocks in a given slice.

Figure 12:
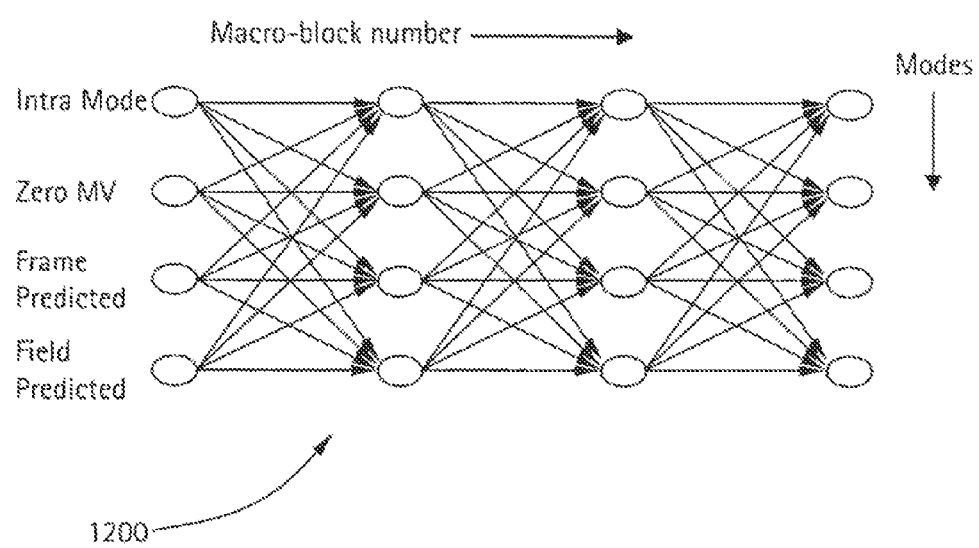
FIG. 12 shows an N×M dimensional trellis topology of modes and macroblocks, used for computation for Globally Optimum Macroblock Mode Selection.

Let 'R' be the bits needed to code a macroblock in a given mode. Then, R includes the DCT bits, macroblock header bits and the motion vector bits. Let 'D' be the distortion, which is the mean squared error between the original pixels and the reconstructed pixels. Let 'C(D, R)' be a cost function, which is a function of the distortion 'D' and the bits 'R'. In typical case, C(D, R) can be a Lagrangian function of the form D+λ*R where λ is a constant. Let 'N' be the number of macroblocks in a slice and 'M' be the number of candidate modes. The problem of finding the optimal modes of all the macroblocks in a given slice can be well explained by a trellis 1200 of dimension N×M as shown in FIG. 12. The cost associated with each link in the trellis 1200 is computed using C(D, R). The optimum path is selected as the path along which the sum of the individual link costs is the minimum. To find the minimum cost path, we need to consider $M^N$ paths, which involves lots of computations. The number of computations and searches may be reduced by using sub-optimal methods. Instead of considering all the macroblocks in a slice, a given slice may be divided into smaller regions of macroblocks. Then, the modes of the all the macroblocks are optimized in the smaller region. Better results can be obtained if we overlap the regions.

Figure 13:
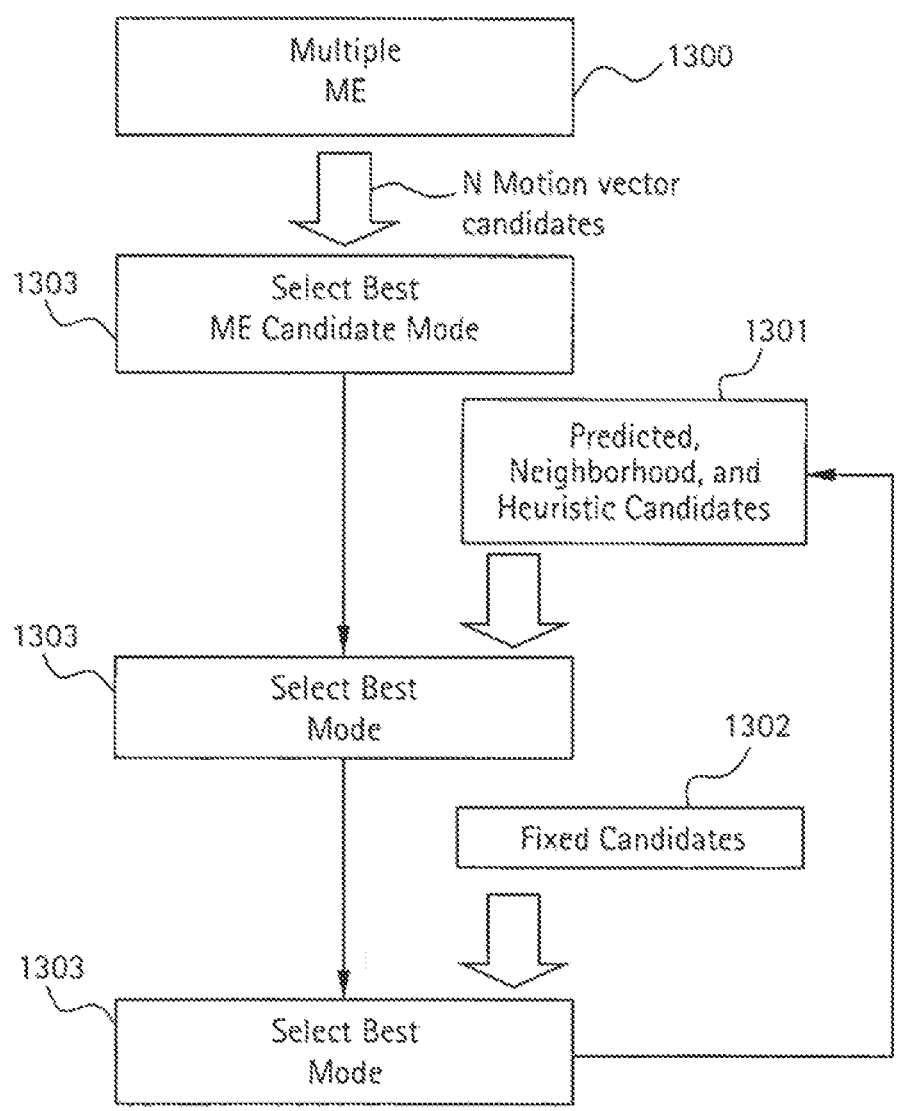
FIG. 13 shows a block diagram of the R(D) Macroblock Mode Selection process.

Another embodiment of the invention, depicted as 284 in FIG. 2 and known as RD Macroblock Mode Selection, involves a method for selecting the optimal encoding mode for a particular MB in a P or B picture. As shown in the flowchart in FIG. 13, the selection process includes four operations labeled 1300-1303. In blocks 1300-1302, candidate MB coding modes are found while the final operation, 1303, is used repeatedly to choose between candidate encoding modes.

The candidate macroblock coding modes are found by: (1) using inter forward and/or backward prediction with different motion estimates produced by 1300, (2) using predicted, neighborhood, or heuristic motion estimates or modes produced by 1301, and (3) using a fixed set of modes produced by 1302. The multiple motion estimates produced in 1300 are computed using the standard SAD calculation augmented with a smoothness penalty. Specifically, for a set of smoothness constraints $\{\lambda_1, \lambda_2, \Lambda, \lambda_N\}$ 1300 finds up to N distinct motion vectors that minimize SAD(MV)+λR (MV) where SAD(MV) is the sum of absolute differences associated with MV while R(MV) is an estimate of the number of bits required to code MV.

Adding the predicted, neighborhood, or heuristic candidates in 1301 leads to better results without requiring extra motion estimation complexity. The predicted mode for the current MB refers to the mode of the MB directly to the left whereas a neighborhood mode can refer to the mode of any MB to the left or above the current MB. In most cases, fewer bits are required to specify the predicted mode. Heuristic modes are found by using simple rules derived from statistics collection. Finally, the fixed candidates in 1302 are usually known apriori or may be dictated by the video quality monitor or computational constraints. As a concrete an example, an effective set of mode candidates for a macroblock in a P frame is given by:

1. INTER using N 'optimal' field/frame MVs (from 1300).
2. INTER using the predicted field/frame MV (from 1301)
3. INTER using the field/frame MV taken from MB directly above the current one (from 1301).
4. INTER using 0 MV if the scene change index has not changed (from 1301).
5. INTRA (1302)

Figure 14:
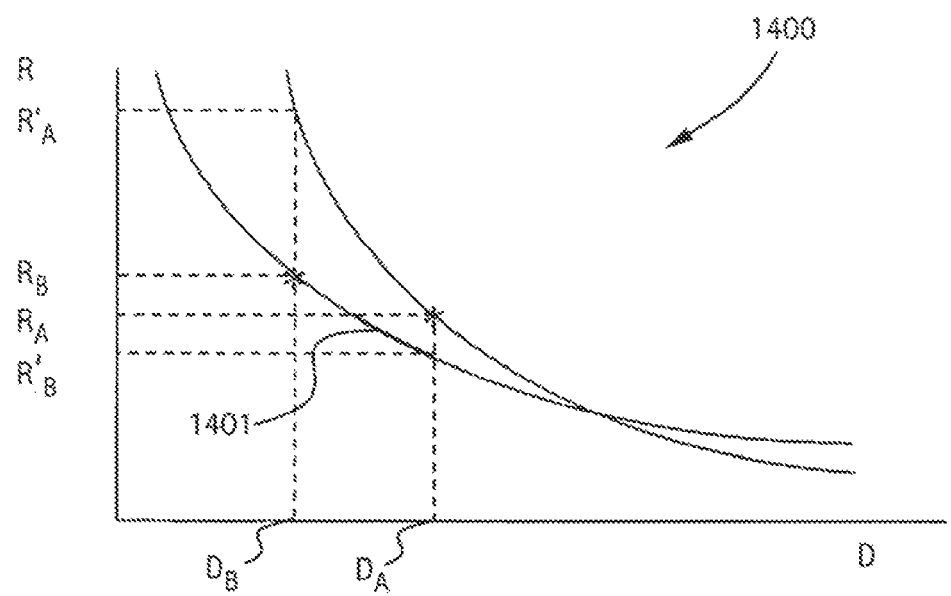
FIG. 14 shows the bit rate vs. distortion curves for two different candidate modes, and the means by which the mode selection is made.
Figure 15:
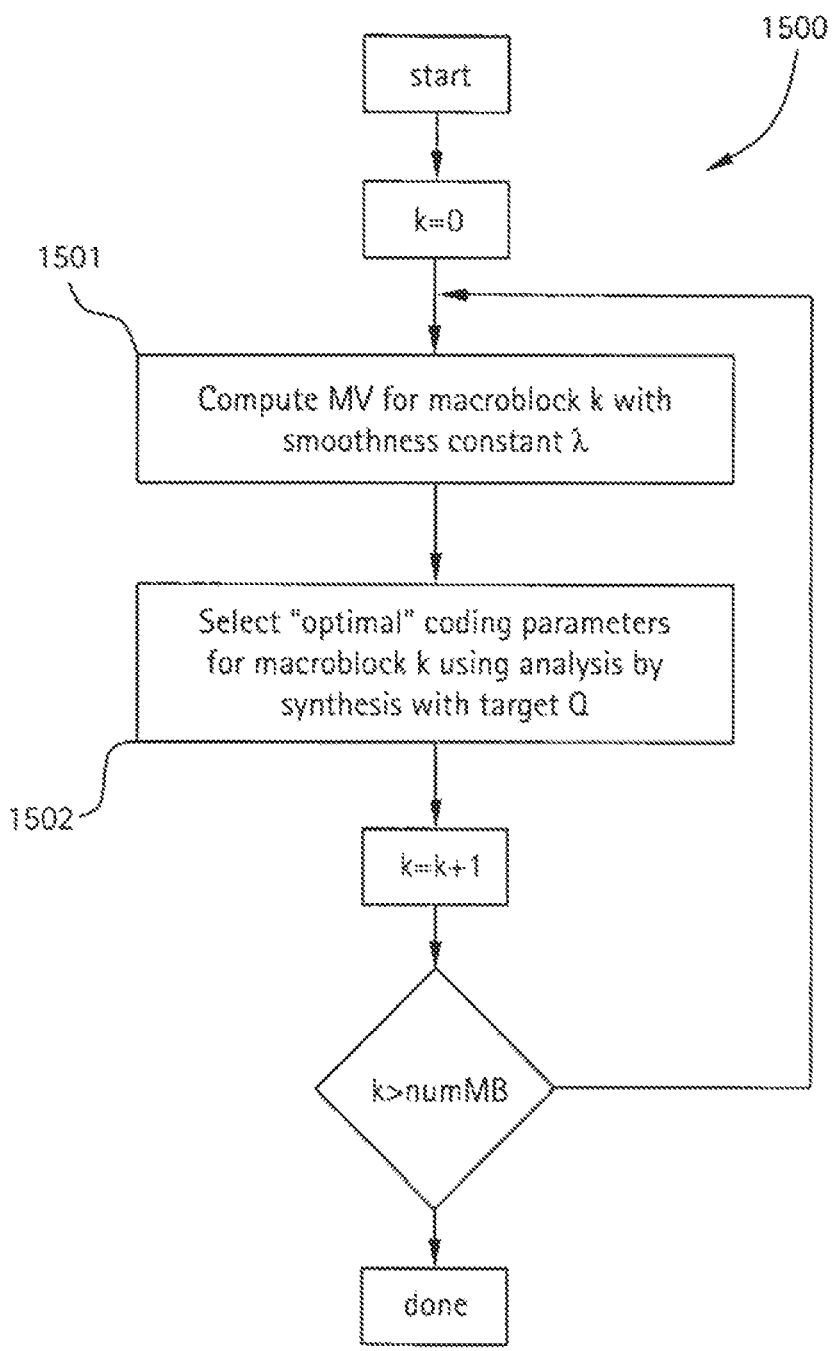
FIG. 15 shows a block diagram for the algorithm for R(D) Macroblock Mode Selection.

1303 is used to find the best encoding mode for each macroblock. This is done by comparing every candidate mode to the currently known best mode. If the candidate mode is superior then it becomes the best known mode. The approach used is an analysis by synthesis strategy that involves computing or estimating the distortion (D), header bits (H), and DCT bits (B) for every candidate mode. The total rate for a particular mode is then given by R=B+H. Typically the values of D and R are determined using a fixed Q for every possible mode. Note that a simple way to incorporate HVS information into this mode selection routine is to bias this measured value for D. For example, the INTRA mode distortion is often biased to reduce the likelihood of producing blocky images. Once D, H, B are known for two candidate modes (A and B), the task is to determine which mode is superior. The clear choices are:

(1) Pick A if $D_A < D_B$ and $R_a < R_b$
(2) Pick B if $D_A > D_B$ and $R_a > R_b$ Typically, the choice is not so clear cut. A common scenario is shown on the RD plots in FIG. 14. The upper curve in this plot represents the true RD relationship for candidate mode A while the lower curve is for mode B. The empirical measurements of D and R occur at arbitrary locations on these curves shown by '*'. Note that if the measurement for mode B happened to occur along the shaded region of the lower curve, then the second rule above would apply and it would be clear that mode B is optimal. However, as shown in FIG. 14 at the measured points $R_a < R_b$ and $D_a > D_b$. The decision is made by considering $R'_a$ defined as the rate required for mode A to give a distortion of $D_b$; and $R'_b$ defined as the rate required for mode B to give distortion $D_a$. With these definitions, the mode choice becomes:

1. Pick A if $D_a < D_b$ and $R_a < R_b$
2. Pick A if $R'_a - R_b < R'_b - R_a$
3. Pick B otherwise A problem with the approach explained above is that the true RD curve is not available to determine the values of $R'_a$ and $R'_b$. The example above is used to illustrate the motivation behind the mode decisions, but in practice a bit production model is necessary to estimate the RD curve from the measurement of D, B, and H. In general any approach that gives a way to estimate points on the RD curve is appropriate, but a simple practical model suggested by TM5 is $$R = \frac{K}{D} + H.$$

With this simple model and using the general approach outlined above, the choice between two candidate modes is made in 1303 by following these rules:

1. Choose mode A if $D_a < D_b$ and $R_a < R_b$
2. Choose mode A if $B_a D_a^2 + H_a D_a D_b - R_b - B_b D_b^2 - H_b - D_a D_b + R_a < 0$
3. Otherwise choose mode B Another embodiment of the invention involves a high rate transport stream for video. The MPEG2 standard describes a scheme for packetizing single program streams, consisting of multiple media streams, such as audio and video, and multiple program streams, into transport packets. Additional information can be included in the transport packets describing system information such as network information (NIT) and conditional access information (CAT). Along with the program elementary streams and system information is timing information allowing the original media timing to be reconstructed at the decoder. The transport packets are typically carried on high-speed physical interfaces such as those described by the DVB-ASI standard. In this case the physical rate is 270 Mbits/s, although the rate for a typical transport (or program) stream is less than 6 Mbits/s. A critical component of the transport packet generation is the insertion of accurate time stamps related to a counter running synchronously to the video (and/or audio) samples. The combination of high-speed physical transport, accurate time stamps, and complex protocol generation requires a careful consideration of implementation architecture to meet the above requirements in a cost-effective manner.

This aspect of the invention can be implemented in the Transport multiplexer block 284 of FIG. 2.

Figure 16:
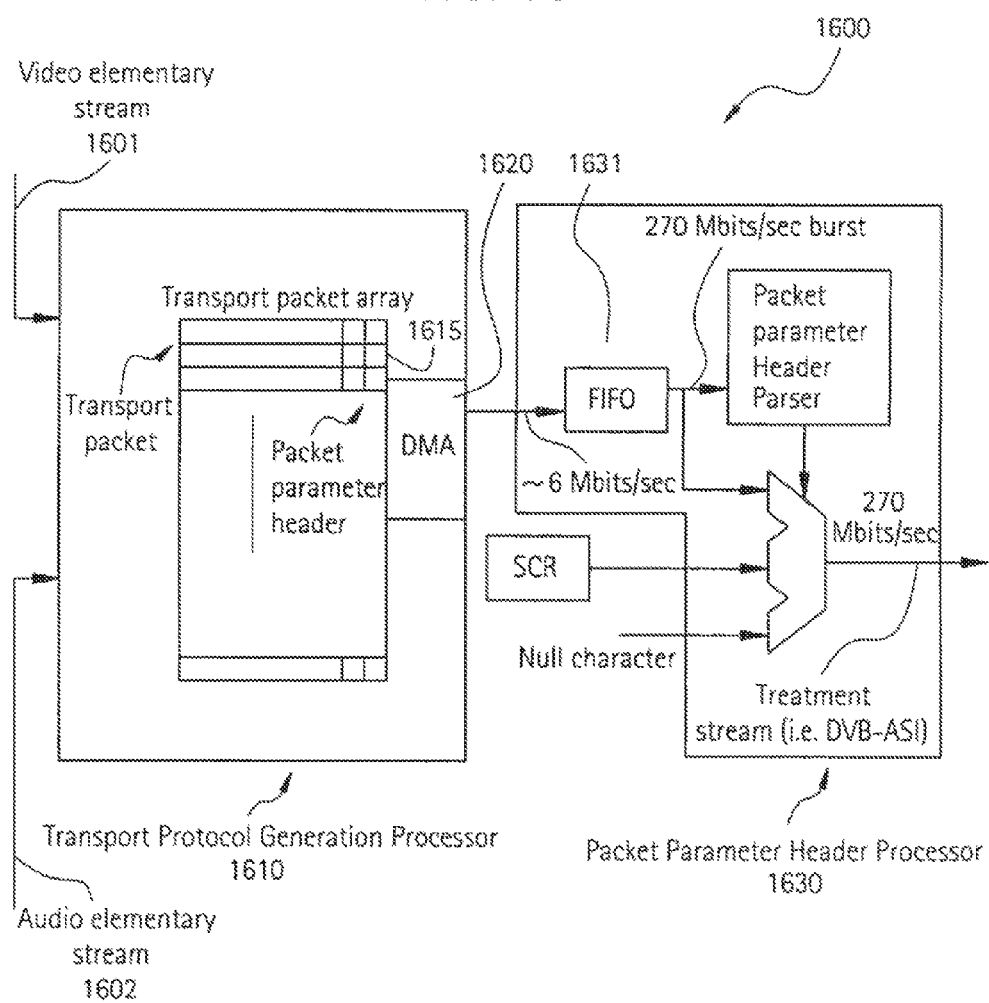
FIG. 16 shows an architecture for a high rate transport stream for video, according to one embodiment Of the invention.

FIG. 16 shows an architecture 1600 for implementing all the components of the transport stream at high physical interface rates. The video elementary stream 1601 and audio elementary stream 1602 are put into transport packets by the "transport protocol generation processor" 1610 that also generates the necessary additional packet types, such as NIT and CAT packets. It also calculates and generates the appropriate number of null packets to achieve the target transport rate. In addition, it appends a "packet parameter header" 1615 to each transport packet that signals a following processor to append null characters and, e.g., insert time stamps into the transport packets. This processor implements a complex protocol, but operates at a low rate, so a general purpose processor can be used to implement this portion. In order to minimize loading on the processor, blocks of transport packets, with "packet parameter headers" 1615 can be accumulated and transmitted to a following processor using direct memory access controller, (DMA) 1620. The transport packets are then processed by a "packet parameter header processor" 1630 that increases the rate to the physical transport rate using a fifo (first in first out) 1631 and implements the operations specified in the "packet parameter header." This consists of e.g., inserting a time stamp from the SCR and transmitting the number of null characters specified to achieve the 270 Mbit/s rate. This process implements single operations at high speeds and can be efficiently implemented in programmable logic, e.g., an FPGA, or in custom logic.

Figure 17:
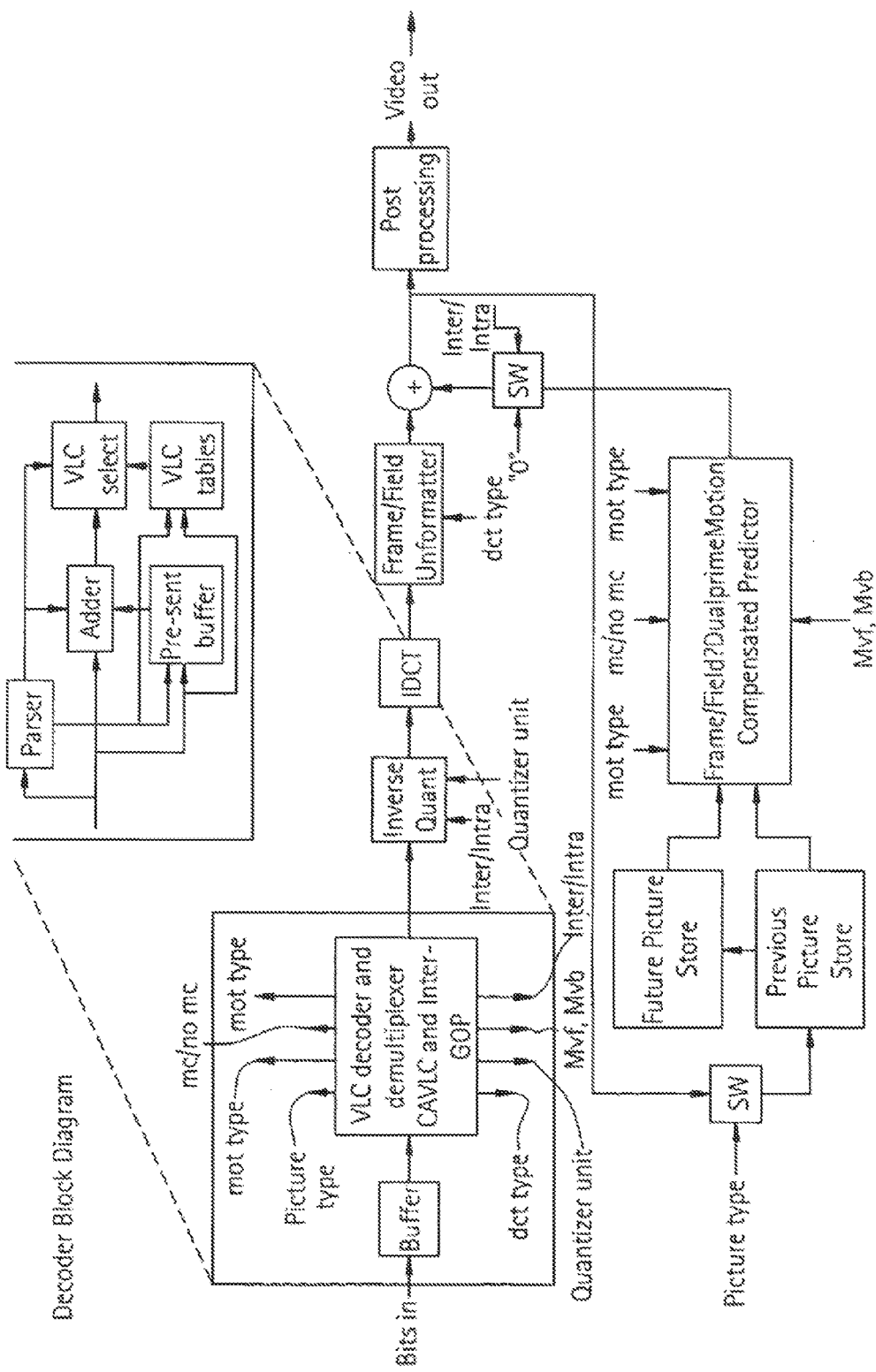
FIG. 17 shows a block diagram of an MPEG decoder.

Another embodiment of the invention involves enhancements to the Decoder segment of video processing. An enhanced MPEG decoder would include operations analogous to those performed in operations 226, 228, 250, 252, 256, 260, and 254 of FIG. 2. Data input to operations analogous to operation 226 would come from a VLC decoder based on a bitstream input to the decoder. Digital video output would be obtained between operations analogous to operations 252 and 256. A decoder is diagrammed in FIG. 17. An MPEG decoder is implemented in hardware and software on a television set top box, as diagrammed FIG. 18.

According to one aspect, a method for modifying video decoding in a processor using a video application specific integrated circuit includes the step of modifying variable length decoded data before passing the data to the circuit.

According to another aspect, a method for modifying video decoding in a processor using a video application specific integrated circuit includes the step of modifying data representing a predicted frame stored in a memory component used by the circuit.

According to another aspect, a method for modifying video decoding in a processor using a video application specific integrated circuit includes the step of modifying data representing a reconstructed frame stored in a memory component used by the circuit before passing the reconstructed output from the memory component of a video presentation component.

Figure 18:
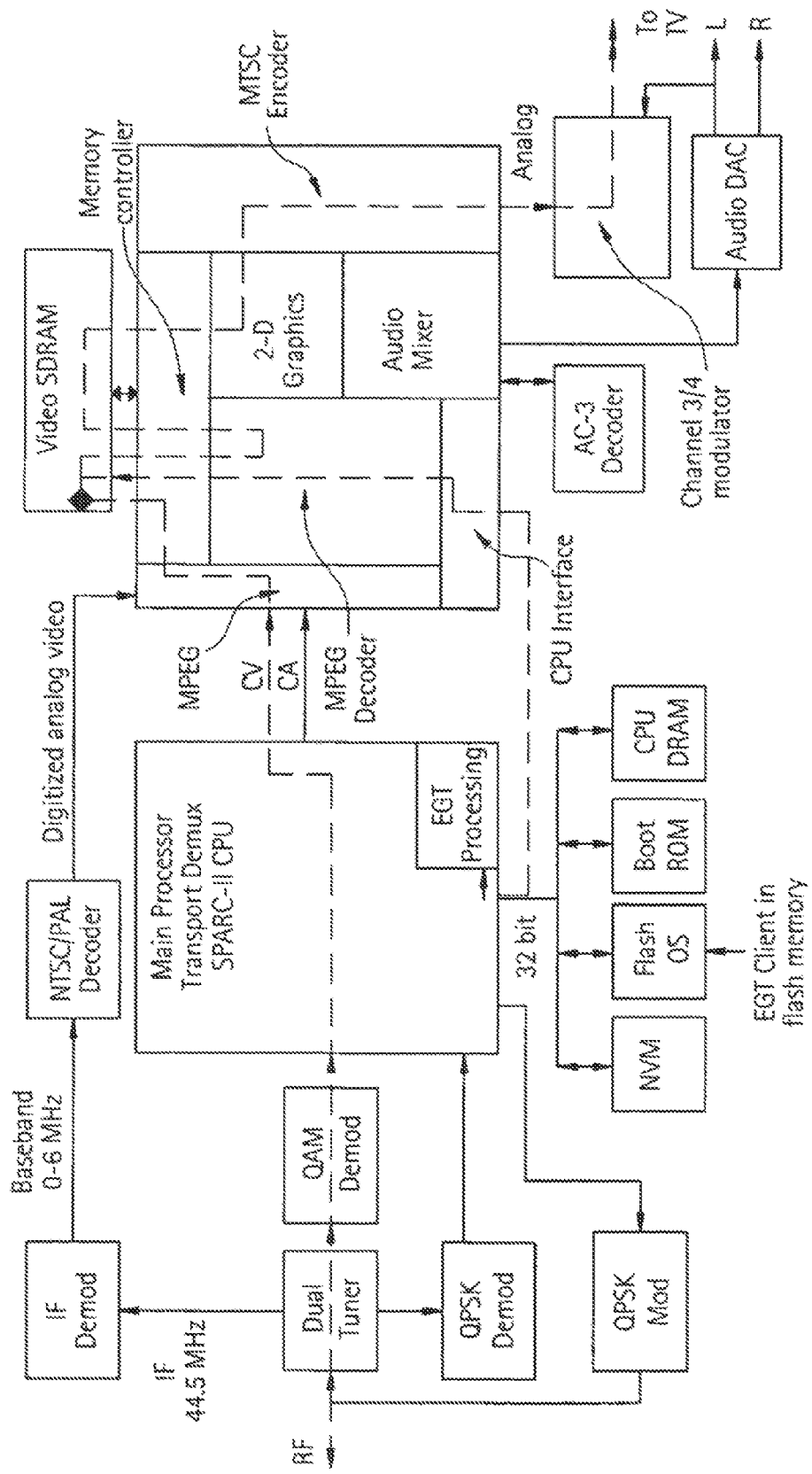
FIG. 18 shows a block diagram of an MPEG decoder implemented in hardware and software.

Legacy video clients for cable television system (set top boxes) include dedicated circuits which decode MPEG2 bitstreams. This provides a efficient, cost effective solution for decoding the elementary MPEG2 bitstreams, however, prevents the modification of the encoding algorithm to include recent enhancement that allow quality improvement on bit rate reductions. This technique allows algorithm enhancement to be included in legacy set top boxes by implementing the new algorithms in the RISC processor typically used for bitstream demultiplexing, control and applications (e.g., channel guide). FIG. 18 shows a typical block diagram at a set top box.

Figure 19:
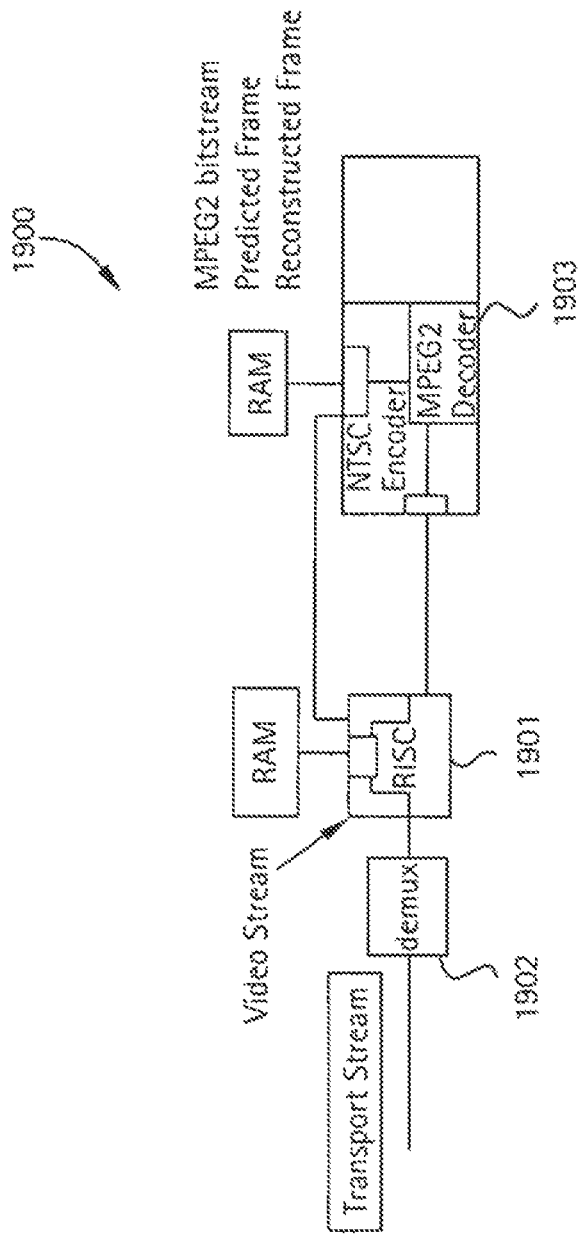
FIG. 19 shows a block diagram of a cable television set top box.

Legacy video clients for cable television system (set top boxes) include dedicated circuits that decode MPEG2 bitstreams. This provides a efficient, cost effective solution for decoding the elementary MPEG2 bitstreams. However, this prevents the modification of the encoding algorithm to include recent enhancement that allow quality improvement on bit rate reductions. This invention is a technique that allows algorithm enhancement to be included in legacy set top boxes by implementing the new algorithms in the RISC 1901 processor typically used for bitstream demultiplexing, control and applications (e.g., channel guide). FIG. 19 shows a typical block diagram at a set top box.

In this architectural the transport stream is demultiplexed and the elementary video stream is stored in the ASIC RAM 1903 for use by the MPEG2 decoder. This memory is accessible by the RISC 1901 through a memory interface. The ASIC memory 1903 also contains the prediction frame generated by the MPEG2 decoder, and the reconstructed frame that is eventually converted to NTSC analog video.

This invention allows the addition of new encoding/decoding algorithm components through the use of the RISC processor 1901 and access to the MPEG2 bitstream, predicted frame, and reconstructed frame in the ASIC RAM 1903 by the RISC.

1) There are three (3) places in the algorithm sequence that can be modified: the bitstream can be modified before being passed to the MPEG2 decoder.
2) The predicted frame can be modified to include additional techniques which are not included in standard MPEG2 decoders.
3) The reconstructed frame can be processed, e.g., post filtered, before being passed to the NTSC encoder.

An example of 1) is error concealment in which the bitstream is passed by the RISC in order to determine lost information through MPEG2 syntax errors. Concealment algorithms are applied and a new bitstream is generated and stored in the ASIC RAM before decoding of that frame begins. Another technique is to implement enhancement algorithms, e.g., resolution enhancement, and re-encode a higher rate stream for decoding by the MPEG2 decoder. In both cases it is advantageous to implement the bitstream algorithms in the DCT domain in order to reduce computational complexity.

An example of case 2) is the inclusion of advanced prediction techniques, e.g., H.264 prediction, while using MPEG2 residual coding methods. These techniques make use of bitstream passing and predictor implementations in the RISC and use of the MPEG2 decoder for reconstruction of the frame using the prediction and standard residual coding.

In case 3 the RISC implements algorithms independent of the MPEG2 decoder, making use of the reconstructed frame only.

Another embodiment of the invention is a method for allocating a number of bits to a group of frames in a video compression process. This aspect of the invention, referred to as Inter-GOP Rate Control, includes the steps of: determining a plurality of complexity measures corresponding to a plurality of groups of pictures; and, allocating more bits to a first group of pictures corresponding to a first complexity measure than to a second group of pictures corresponding to a second complexity measure that is less than the first complexity measure.

In the two example embodiments below, the symbol N represents the number of GoPs in the sequence of pictures to be compressed; i is an index from 1 to N representing one of the GoPs; GoPbits(i) represents the number of bits allocated to the ith GoP; and MSE represents the measure of complexity (e.g., the distortion or the variance) of the ith GoP. The symbol α here is an experimentally determined constant that is different from the term α used in Eq. 1 and Eq. 3 for the p-rate control techniques. In the second illustrated embodiment, $\Delta bits_i$, represents the change in allocation of bits to the ith GoP.

In the MPEG encoder, the technique is implemented in operations 280 and 236. Operation 280 analyzes GoP complexity using the frames stored in the frame delay operation 204 and using results of the HVS model 270 to allocate bits to each GoP.

Segments of video sequences exhibit varying levels of complexity and therefore varying bit rates in order to result in equivalent coding quality. In theory one can develop rate and distortion models that allow optimal rate allocation that minimizes the distortion across an entire sequence however, in practice, accurate models are difficult to develop and constraints on complexity, memory, and latency limit the application of these optimal approaches. The invention describes a heuristic approach to inter GoP bit allocation that uses the coding process to estimate coding difficulty and a simple approach to move bits from easier to more complex segments of the sequence.

The algorithm consists of the following steps.

1) Encode N GoPs, where N ranges from 2 to the length of the sequence, using a fixed number of bits for each GoP. The number of bits should correspond to the desired fixed (average) coding rate for the sequence. In order to reduce the complexity of the process, the motion vector should be estimated from the original frames and stored for reuse in the second pass.

2) A distortion measure (e.g., mse) should be stored for each GoP coded in step for subsequent use in the bit allocation algorithm.

3) Starting with the original fixed number of bits per GoP, the following bit reassignment is made.

(A) Generate a "bit pool" by accumulating bits taken from each GoP with proportion to its distortion relating to the average distortion of the N GoPs considered e.g.

$$\text{bit pool} = \sum_{i=1}^{N} \alpha \cdot GOPbits(i) \cdot (mse_{AVG} - mse(i))$$

where $$mse_{AVG} = \frac{1}{N} \sum_{i=1}^{N} mse(i), (mse_{ave} - mse(i)) > \phi,$$

and ∝ is an experimentally determined value varying from 0-1. In practice a value in the range 0.25-0.5 is used.

B) Reallocate the "bit pool" to the GoPs, within the N GoPs, that have larger than average distortion, e.g.

$$GoP \text{ bits}(i) \mathrel{+}= \text{"bit pool"} \cdot \frac{mse(i)}{mseMax}$$

Where $$mseMax = \sum_{i=1}^{N} mse(i)$$

for $mse(i) > mse_{AVG}$

4) Re-encode the N GoPs using the previously calculated motion vectors and the bit allocation detained in step 3.

The above algorithm reduces the variance of the distortion among the groups of N GoPs while maintaining the same average it rate.

Flowchart for Inter-GoP Bit Allocation:
1. buffer N GoPs for reallocation of bits.
2. calculate complexity measure of buffered GoPs e.g. encode N GoPs using fixed rate per GoP
   calculate MSE for each GoP from reconstructed frames
   compute average ($MSE_{avg}$) and minimum ($MSE_{min}$) for GoPS
   save encoding parameters (e.g. motion vectors) for second pass encoding
3. accumulate bitpool by reducing the fixed rate allocated to each $GoP_i$ where $MSE_i < MSE_{avg}$ according to the equation $$bitpool = \sum_{i \text{ s.t. } MSE_i < mse_{avg}} \alpha * RDCT_i * (MSE_{avg} - MSE_i) / (MSE_{avg} - MSE_{min})$$

where α is a parameter taking on values between 0.25 and 0.5, and $RDCT_i$ is the number of bits used for coding the DCTs for $GOP_i$ in the first pass. MSEavg is the average MSE over the N GoPs and $MSE_{min}$ is the minimum MSE.

4. reallocate the bit-pool to the GoPs having larger than average MSE according to the equation $$\Delta bits_i = bitpool * MSE_i \Big/ \sum_{j \text{ s.t. } MSE_j > MSE_{avg}} MSE_j$$

5. re-encode the frame using the previous encoding parameters and the new bit allocation.

Another embodiment of the invention implements Quantizer Dependent Variable Length Codes. According to this aspect, a method for compressing video data transformed to amplitudes for different wavelengths includes the steps of: determining a degree of quantization applied to the amplitudes; determining a particular table of a plurality of tables based on the degree of quantization, wherein each table relates variable length codes to data sequences based on frequency of occurrence of the data sequences; and performing at least one of coding and decoding data indicating the amplitudes by using the particular table.

Figure 20:
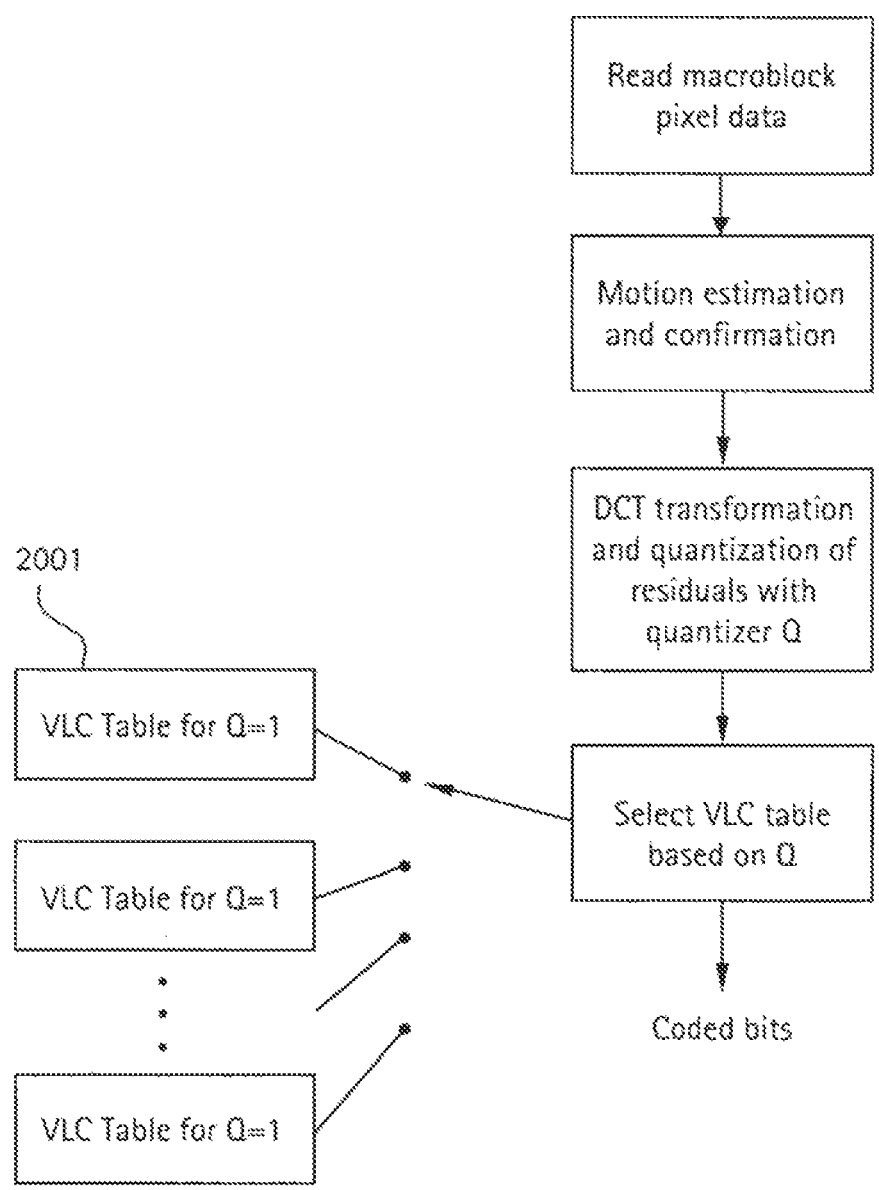
FIG. 20 shows an implementation for quantizer dependent variable length code selection.

An example embodiment is illustrated in FIG. 20. In this embodiment, the degree of quantization is represented by the quantizer_scale_code. A different table 2001 is generated for each different range of quantizer_scale_code values based on observed statistics for DCT amplitude data produced with that range of quantizer_scale_code values. The table is stored in association with the range of quantizer scale_code_values.

In some embodiments, steps of this method are implemented in the VLC statistics processor 234, the VLC Select operation 232, and the VLC encoder and MUX 230 of FIG. 2.

MPEG and H.26X video compression standards use discrete cosine transform and motion compensation to remove the spatial and temporal redundancy in video frames. This is followed by quantizing the resulting DCT coefficients and entropy coding the run-level pair using variable length codes. The quantization of the DCT coefficient depends on two factors: (i) the position of the coefficient in the zig-zag scan (ii) the quantizer_scale_code used for the current macroblock.

The quantizer_scale_code takes values in the range of 1 to 31. Larger values of the quantizer_scale_code results in more zeros in the quantized DCT coefficients. Different values of the quantizer_scale_code will result in different statistics for the run-level pair of the DCT coefficient. Therefore, efficient entropy coding of the DCT coefficients is achieved using variable length code tables that depend on the quantizer_scale_code.

The procedure for encoding using quantizer dependent VLC table is as follows:
(i) For different values of the quantizer-scale-code maintain different VLC table. It is also possible to use the same VLC table for a range of values of the quantizer-scale-code.
(ii) Choose a quantizer-scale-code for coding the current macroblock. This decision is based on the bit allocation and complexity of the macroblock.
(iii) When coding the luminanace and the chrominanace blocks of the current macroblock, use the VLC table corresponding to the already chosen quantizer-scale-code.

The decoder performs the same set of operations as the encoder. It reads the quantizer-scale-code for the current macroblock from the compressed bit stream. Based on the value of the quantizer-scale-coder the decoder select the appropriate VLC table for decoding the current macroblock.

Figure 1:
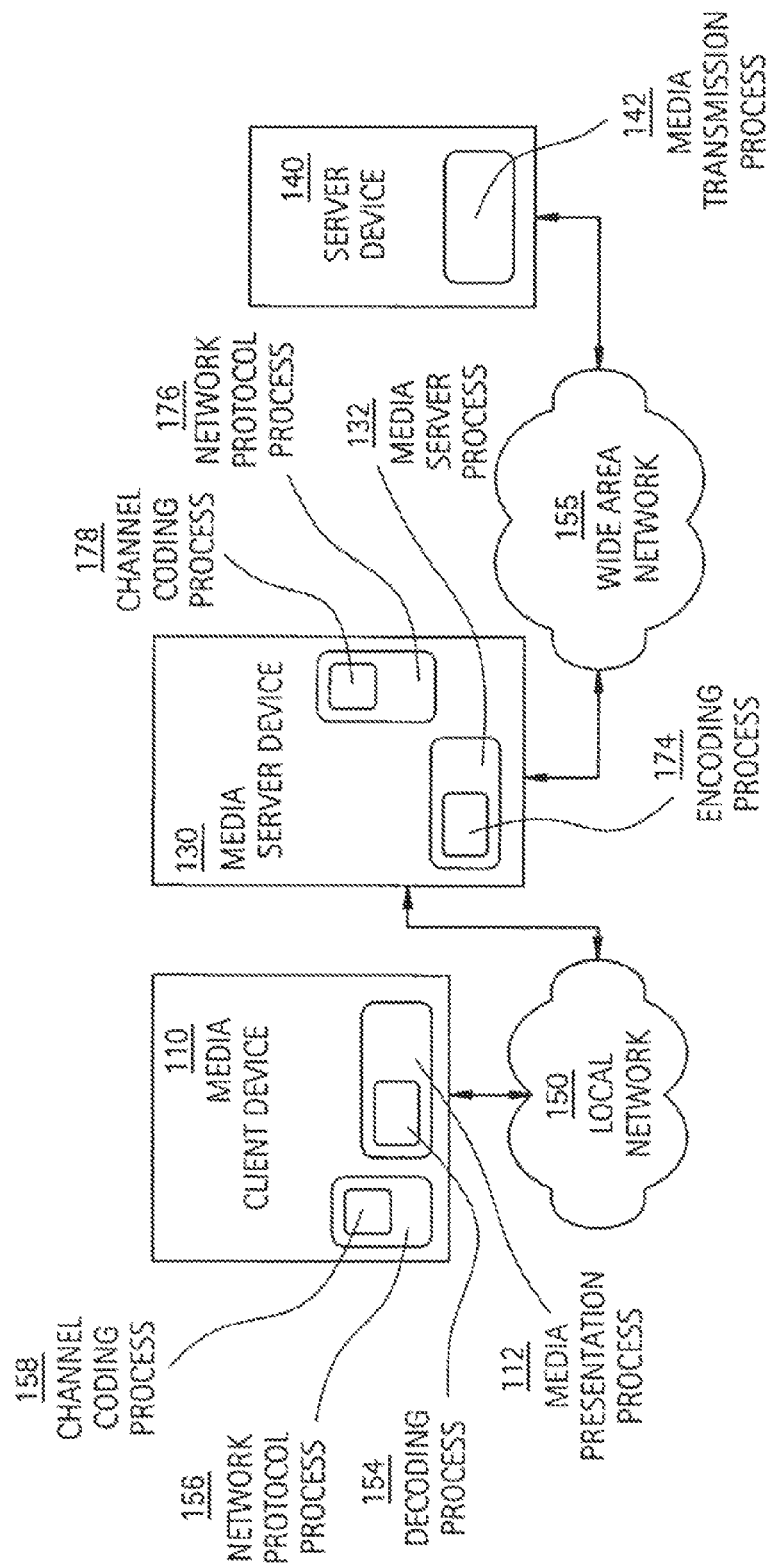
FIG. 1 is a block diagram that illustrates a system for delivering multi-media data using computer hardware over a network.
Figure 21:
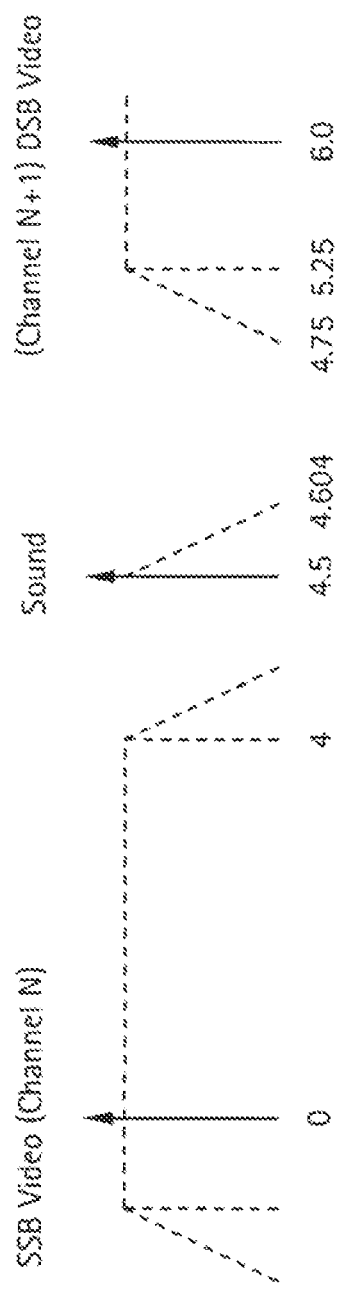
FIG. 21 shows a diagram depicting the insertion of digital video bitstreams into guardbands between analog TV channels.

Another aspect of the invention involves a method for broadcasting analog television signals including at least one analog television channel includes the steps of: compressing digital video data to a bandwidth of about 0.6 MegaHertz or less; and inserting the digital video data at a particular band of analog frequencies where the analog television channel signal is below some threshold signal level for at least a particular duration. In some circumstances, video data are transmitted to the media client device (110 in FIG. 1) as analog television signals that are separated by frequencies of 6 million cycles per second (MegaHertz, "MHz"). See FIG. 21 for a diagram depicting the insertion of digital video bitstreams into guardbands between analog TV channels.

In some embodiments, steps of this method are implemented in the Modulator block 286 of FIG. 2.

In the first such embodiment, the particular band is between analog television channels where the analog television signal level is always below the threshold. In the second embodiment, the particular hand is one at which the analog channel signal level is below the threshold for a limited duration. In the second embodiment, "SNR" represents the signal to noise ratio.

Currently, separate 6 MHz channel sets carry analog and digital television programs in a cable TV frequency plan. Because of compression technology, a single 6 MHz channel can carry multiple digital TV (channel programs. In this invention, we show how digital TV programs—or at least one digital TV program—can be accommodated in-band (within or adjacent to an analog television channel of 6 MHz bandwidth).

In-band Adjacent Channel. In this plan bitstreams carrying digital TV information will be inserted into the guardbands between adjacent analog TV channels. Depending on—further research and experimentation, we expect this inter-channel gap to be in the range of 0.1 to 0.6 MHz. (See FIG. 21 for Frequency Plan).

In-band On Channel. In this approach, digital information would be inserted directly into the valleys in the short-term (time varying) analog TV Spectrum, based on thresholds for insertion. These thresholds can be based on SNR criteria or on subjective criteria like JND (just noticeable distortion). Besides requiring careful insertion, this approach needs to signify frequency locations where digital information is inserted. So combinations of A and B above are possible, method A seems to be the most practical, especially if constraints on digital TV quality can be less stringent than those associated with a regular 5 MHz digital TV program set.

To explain further, if a 6 MHz bank can carry 10 digital programs after compression, 1 such program requires a bandwidth of 0.6 MHz. This is exactly the upper end of the available range in FIG. 21. As we move away from 0.6 MHz to lower BW designs, the quality of the (new) or simulcasted digital television program needs is be relaxed, accordingly. The method can be applied to several TV markets, including non-cable markers (such as terrestrial broadcast).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for allocating bits among portions of a frame in a video encoding implementation, said allocation intended to attain a constant bit rate per frame, said method comprising:
   in a processor coupled to a memory, determining a particular class of visual sensitivity for a portion of the frame among a plurality of visual sensitivity classes;
   in the processor, determining a number of bits associated with the particular class; and
   in the processor, establishing a number of bits to be transmitted for the portion based on the number of bits associated with the particular class, wherein a sum over the plurality of classes of a product of the number of bits associated with each class and the probability that the portion belongs to the class is substantively equal to the constant bit rate.

2. A method for adaptive bit allocation, comprising:
   in a processor coupled to a memory, repeatedly and dynamically determining a plurality of parameters associated with a frame of a video stream, the plurality of parameters comprising at least a particular class of visual sensitivity for a portion of the frame among a plurality of visual sensitivity classes; and in the processor, establishing a number of bits to be transmitted for the frame of the video stream based on the determined plurality of parameters, including at least the particular class of visual sensitivity for a portion of the frame;

wherein determining a plurality of parameters associated with a frame comprises:

determining a first number of bits for a frame to achieve a target bit rate according to a first procedure that produces values for a number of header bits, a number of coded zeros and a number of DCT bits; and determining a second number of bits for the frame, wherein the determination is based on an actual number of coded zeros for the frame to match the number of DCT bits.

3. The method of claim 2, wherein allocating a bit to the frame based on the determined parameter comprises allocating the second number of bits to the frame.

4. A method for adaptive bit allocation, comprising:

in a processor coupled to a memory, repeatedly and dynamically determining a plurality of parameters associated with a frame of a video stream, the plurality of parameters comprising at least a particular class of visual sensitivity for a portion of the frame among a plurality of visual sensitivity classes; and in the processor, establishing a number of bits to be transmitted for the frame of the video stream based on the determined plurality of parameters, including at least the particular class of visual sensitivity for a portion of the frame;

wherein determining a plurality of parameters associated with a frame comprises:

determining a relationship that relates a variance in a frame to a number of bits for the frame for each type of frame among an I-frame type, P-frame-type and B-frame type in the group of pictures;

determining a variance corresponding to each type of frame in the group of pictures; and determining a number of bits for each type of frame based at least in part on the relationship and the variance of each type of frame and the number of frames of each type of frame.

5. The method of claim 4, wherein allocating a bit to the frame based on the determined parameter comprises allocating the number of bits determined for each type of frame.

6. A method for adaptive bit allocation, comprising:

in a processor coupled to a memory, repeatedly and dynamically determining a plurality of parameters associated with a frame of a video stream, the plurality of parameters comprising at least a particular class of visual sensitivity for a portion of the frame among a plurality of visual sensitivity classes, wherein determining a plurality of parameters associated with a frame comprises determining whether a macroblock within the frame is associated with motion faster than a threshold speed for tracking by a human observer; and in the processor, establishing a number of bits to be transmitted for the frame of the video stream based on the determined plurality of parameters, including at least the particular class of visual sensitivity for a portion of the frame, wherein, establishing a number of bits to be transmitted for the frame based on the determined parameter comprises using fewer bits to represent Discrete Cosine Transform amplitudes for blocks in the macroblock, wherein fewer bits are used if the determination indicates that the macroblock is associated motion faster than the threshold speed.

7. A method for adaptive bit allocation, comprising:

in a processor coupled to a memory, repeatedly and dynamically determining a plurality of parameters associated with a frame of a video stream, the plurality of parameters comprising at least a particular class of visual sensitivity for a portion of the frame among a plurality of visual sensitivity classes; and in the processor, allocating a bit of the memory to the frame of the video stream based on the determined plurality of parameters, including at least the particular class of visual sensitivity for a portion of the frame;

wherein determining a plurality of parameters associated with a frame comprises:

determining a particular class of visual sensitivity for a portion of the frame among a plurality of visual sensitivity classes, and determining a number of bits associated with the particular class; and wherein allocating a bit to the frame based on the determined parameter comprises allocating a number of bits for the portion based on the number of bits associated with the particular class, wherein a sum over the plurality of classes of a product of the number of bits associated with each class and the probability that the portion belongs to the class is substantively equal to the constant bit rate.

8. A system for adaptive bit allocation, comprising:

a memory; and a processor coupled to the memory and being operable to determine a parameter associated with a frame and allocating a bit to the frame based on the determined parameter, the parameter comprising at least a particular class of visual sensitivity for a portion of the frame among a plurality of visual sensitivity classes;

wherein determining a parameter associated with a frame comprises:

determining a first number of bits for a frame to achieve a target bit rate according to a first procedure that produces values for a number of header bits, a number of coded zeros and a number of DCT bits; and determining a second number of bits for the frame, wherein the determination is based on an actual number of coded zeros for the frame to match the number of DCT bits.

9. The system of claim 8, wherein allocating a bit to the frame based on the determined parameter comprises allocating the second number of bits to the frame.

10. A system for adaptive bit allocation, comprising:

a memory; and a processor coupled to the memory and being operable to determine a parameter associated with a frame and allocating a bit to the frame based on the determined parameter, the parameter comprising at least a particular class of visual sensitivity for a portion of the frame among a plurality of visual sensitivity classes;

wherein determining a parameter associated with a frame comprises:

determining a relationship that relates a variance in a frame to a number of bits for the frame for each type of frame among an I-frame type, P-frame-type and B-frame type in the group of pictures;

determining a variance corresponding to each type of frame in the group of pictures; and determining a number of bits for each type of frame based at least in part on the relationship and the variance of each type of frame and the number of frames of each type of frame.

11. The system of claim 10, wherein allocating a bit to the frame based on the determined parameter comprises allocating the number of bits determined for each type of frame.

12. A system for adaptive bit allocation, comprising:
a memory; and
a processor coupled to the memory and being operable to determine a parameter associated with a frame and allocating a bit to the frame based on the determined parameter, the parameter comprising at least a particular class of visual sensitivity for a portion of the frame among a plurality of visual sensitivity classes;
wherein determining a parameter associated with a frame comprises determining whether a macroblock within the frame is associated with motion faster than a threshold speed for tracking by a human observer; and
wherein allocating a bit to the frame based on the determined parameter comprises using fewer bits to represent Discrete Cosine Transform amplitudes for blocks in the macroblock, wherein fewer bits are used if the determination indicates that the macroblock is associated motion faster than the threshold speed.

13. A system for adaptive bit allocation, comprising:
a memory; and
a processor coupled to the memory and being operable to determine a parameter associated with a frame and allocating a bit to the frame based on the determined parameter, the parameter comprising at least a particular class of visual sensitivity for a portion of the frame among a plurality of visual sensitivity classes;
wherein determining a parameter associated with a frame comprises:
determining a particular class of visual sensitivity for a portion of the frame among a plurality of visual sensitivity classes; and
determining a number of bits associated with the particular class.

14. The system of claim 13, wherein allocating a bit to the frame based on the determined parameter comprises allocating a number of bits for the portion based on the number of bits associated with the particular class, wherein a sum over the plurality of classes of a product of the number of bits associated with each class and the probability that the portion belongs to the class is substantively equal to the constant bit rate.

* * * * *